(12) United States Patent
Harada et al.

(10) Patent No.: US 8,196,486 B2
(45) Date of Patent: Jun. 12, 2012

(54) BALL SCREW MECHANISM AND ASSEMBLING METHOD OF THE SAME

(75) Inventors: Toru Harada, Fujisawa (JP); Yoshinori Jingu, Fujisawa (JP); Tomofumi Yamashita, Fujisawa (JP); Shingo Saitou, Fujisawa (JP)

(73) Assignee: NSK Ltd., Tokyo (JP)

( * ) Notice: Subject to any disclaimer, the term of this patent is extended or adjusted under 35 U.S.C. 154(b) by 987 days.

(21) Appl. No.: 11/817,631

(22) PCT Filed: Sep. 5, 2006

(86) PCT No.: PCT/JP2006/317578
§ 371 (c)(1),
(2), (4) Date: Aug. 31, 2007

(87) PCT Pub. No.: WO2007/029716
PCT Pub. Date: Mar. 15, 2007

(65) Prior Publication Data
US 2008/0250887 A1    Oct. 16, 2008

(30) Foreign Application Priority Data

Sep. 5, 2005   (JP) ................................. 2005-256406
Dec. 14, 2005  (JP) ................................. 2005-359791
Mar. 10, 2006  (JP) ................................. 2006-065786
Jul. 27, 2006  (JP) ................................. 2006-204097

(51) Int. Cl.
*F16H 1/24* (2006.01)

(52) U.S. Cl. ................. 74/424.81; 74/424.84; 74/424.86
(58) Field of Classification Search ............... 74/434.81, 74/424.82, 424.86, 424.87, 424.71, 424.84
See application file for complete search history.

(56) References Cited

U.S. PATENT DOCUMENTS

| 3,009,367 | A | | 11/1961 | Striggow |
| 3,244,022 | A | * | 4/1966 | Wysong, Jr. ................ 74/424.75 |
| 7,017,437 | B1 | * | 3/2006 | Zernickel et al. ............ 74/89.42 |
| 7,337,689 | B2 | * | 3/2008 | Yamamoto et al. ........ 74/424.75 |

FOREIGN PATENT DOCUMENTS

| EP | 1 500 572 A2 | | 1/2005 |
| JP | 62-122971 U | | 8/1987 |
| JP | 64-11466 UM | | 1/1989 |
| JP | 5-138458 A | | 6/1993 |
| JP | 2760455 B2 | | 3/1998 |
| JP | 10110801 A | * | 4/1998 |
| JP | 3088812 B2 | | 7/2000 |
| JP | 2002-21968 A | | 1/2002 |
| JP | 2003-524121 A | | 8/2003 |
| JP | 2004-114224 A | | 4/2004 |
| JP | 2004108538 A | * | 4/2004 |

* cited by examiner

Primary Examiner — Thomas R Hannon
Assistant Examiner — Phillip A Johnson
(74) Attorney, Agent, or Firm — Sughrue Mion, PLLC

(57) ABSTRACT

Since it is configured that an female screw groove 2a of a nut 2 extends round an axis of the nut 2 through 360 degrees or less and a sectional shape thereof taken at right angles to the groove contains a circular arc portion 2c of 90 degrees or less and a rectilinear portion 2d which connects to the circular arc portion at a bottom of the groove and extends in parallel with the axis, after molding, a lower mold LM and an upper mold UM can simply be removed from a barrel mold BM in the axial direction, and consequently, the necessity of provision of a parting plane which passes through the thread groove 2a can be obviated, thereby making it possible to easily form the thread groove 2a which is free from a difference in level or a stepped portion.

25 Claims, 29 Drawing Sheets

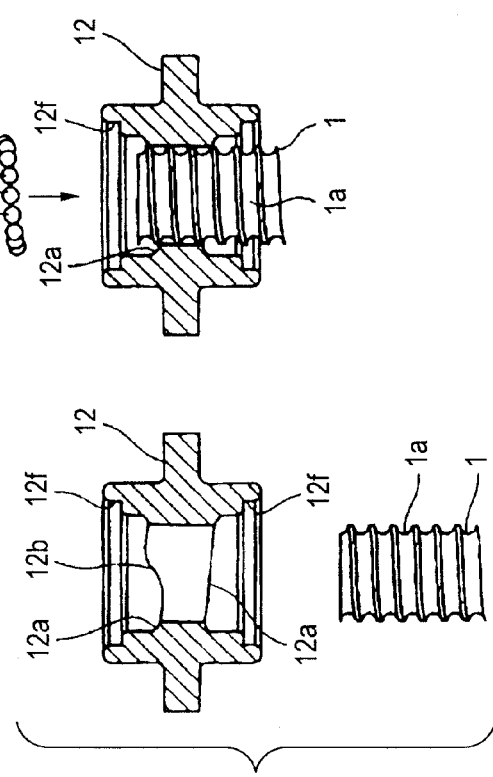
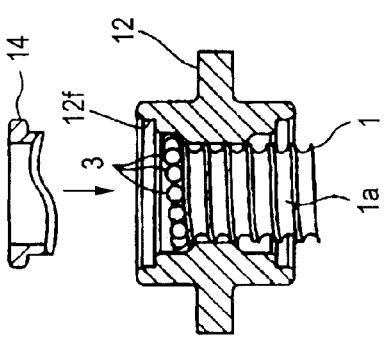
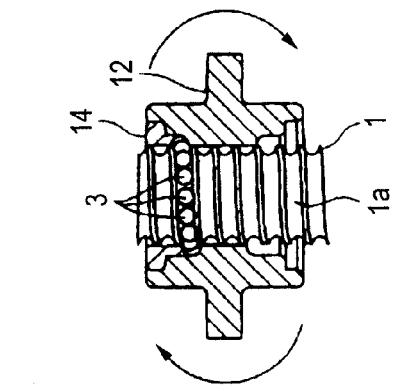
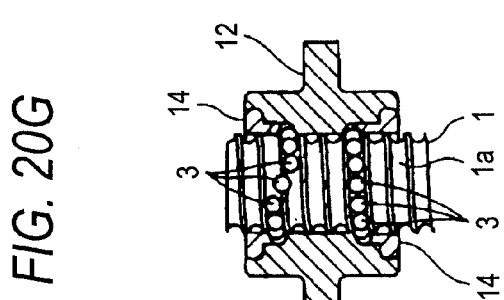
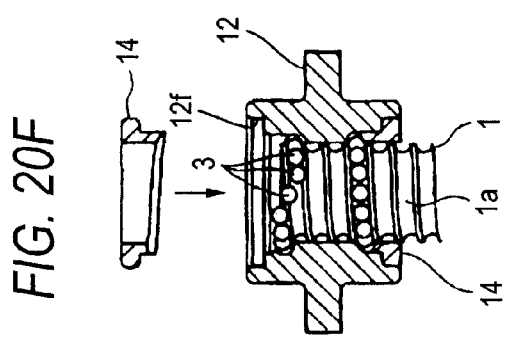
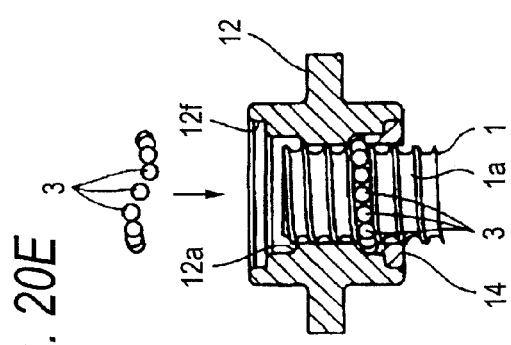

FIG. 29A  FIG. 29B  FIG. 29C
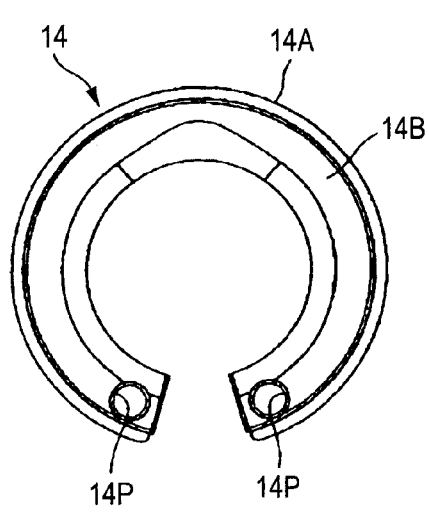
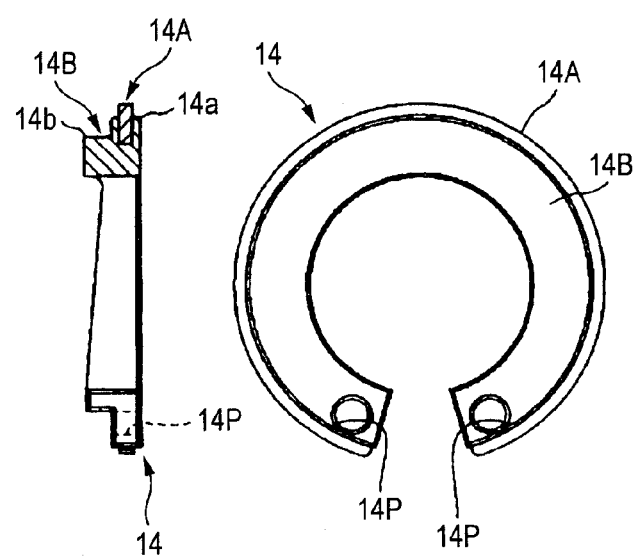

BALL SCREW MECHANISM AND ASSEMBLING METHOD OF THE SAME

TECHNICAL FIELD

The present invention relates to a ball screw mechanism which is assembled on to a general industrial machine or is used on a motor vehicle and a ball screw assembling method.

BACKGROUND ART

In recent years, the trend of saving labor has been advancing on motor vehicles and the like, and for example, systems have been under development in which gearshift in a transmission or application of a parking brake of a motor vehicle is performed not manually but by virtue of power of an electric motor. There may be a case where a ball screw mechanism is used on an electric actuator which is used for the aforesaid application in order to convert rotational motion transmitted from the electric motor to axial motion with high efficiency.

However, although a thread groove is normally formed on a screw shaft and nut of a ball screw mechanism through machining, there is caused a problem that some labor hours are necessary for machining with good accuracy. To cope with this, there is known a technique in which for example, a nut is molded including a thread groove.

In Patent Document No. 1, a technique is proposed in which divided nut parts, each having a shape which results when a nut is divided into two or more parts, are each injection molded, and the divided nut parts so molded are then affixed together so as to form a single nut.

In addition, in Patent Document No. 2, there is proposed a technique in which a ball groove portion member of a nut is formed as being divided in an axial direction at a center of a groove thereof.

Furthermore, in Patent Document No. 3, there is proposed a working process in which injection molding is performed using a core mold which is formed like a shaft having an elongated spiral projection.

Patent Document No. 1: Japanese Utility Model Unexamined Publication JP-UM-A-64-11466
Patent Document No. 2: U.S. Pat. No. 3,009,367
Patent Document No. 3: Japanese Patent Examined Publication JP-B-3088812
Patent Document No. 4: Japanese Patent Examined Publication JP-B-2760455

DISCLOSURE OF THE INVENTION

Problem that the Invention is to Solve

Incidentally, when a nut of a ball screw mechanism is produced by a working method such as injection molding which uses a mold, as is described in Patent Document Nos. 1, 2, it is considered that two or more divided parts are produced through injection molding or the like and thereafter, the parts so produced are assembled together.

When the nut is produced using this method, however, since a means is necessary for connecting together the two or more parts with good accuracy, this becomes a cause for increase in cost. In addition, even though the parts are assembled together with care, a slight difference in level or a stepped portion tends to be easily produced between mating surfaces of the divided nut parts, and in the event that a thread groove is divided, there is called for a risk that abnormal noise or vibration is produced when balls pass a stepped portion that would be so produced. Furthermore, depending upon the number of divided parts (in particular, when the part is divided into two), since the shape of the thread groove in the vicinity of the divided portion is difficult to be an ideal shape, there may be caused a risk that smooth rolling of balls is interrupted, and depending upon cases, finishing work is necessary, and more labor hours are required.

On the other hand, when a screw shaft is integrally molded by an MIM (Metal Injection Molding) or a forging method including an male screw groove, a screw shaft can be molded without dividing the screw shaft itself by utilizing an upper mold and a lower mold which are divided along a plane which passes through an axis of the screw shaft. However, discontinuous stepped portions are produced or burs are produced at mating surfaces of the upper mold and the lower mold used, and when stepped portions are imparted to the thread groove, there may be caused a risk that the operability of a ball screw mechanism is badly affected.

When an axial division is implemented about the thread groove, working using injection molding or the like becomes possible. In this case, too, however, a means is necessary for connecting together divided members. Furthermore, on top of that, compared to grinding work or cutting work, it becomes difficult to maintain the accuracy of those parts. Because of this, in the event that two female screw grooves are provided on a single nut, finishing work has to be performed, or for example, a spring or the like is built in between the two groove members in an assembled unit, so as change the positions of the groove members. As this occurs, the number of parts involved is increased, resulting in an increase in cost.

Furthermore, in Patent Document No. 3, there is proposed the technique in which injection molding is performed using the core mold having the elongated spiral projection without dividing the nut member in the axial direction. However, there exists a problem that in general, much difficulty is involved in removing the core mold after an injection. In addition, even though the core mold can be removed, the core mold has to be moved in such a manner as to be synchronized with a lead of a screw at the time of removal. Therefore, the working apparatus itself becomes complicated, or a method is also necessary in which the core mold is removed manually by the worker.

In addition, when two female screw grooves are formed on a nut, in consideration of the durability life of the female screw groove, a distance between the female screw grooves is desirably made to be equal to a distance between male screw grooves on a mating screw shaft. Namely, a lead of the male screw groove on the screw shaft is made to be equal to a lead of the female screw groove on the nut.

However, it is in fact impossible that both the leads are made to be totally equal to each other. Therefore, if possible, an error is desirably several μm and should be suppressed to on the order of 10 μm even in the worst case. In the event that a thread groove is formed by injection molding or the like, however, due to the nature of the working, it is very difficult to maintain the relative error in position of the thread grooves to 10 μm or less. As a result of the working accuracy being not maintained, the single thread groove has to be subjected to moment load. Furthermore, in the event that the lead of the female screw groove becomes larger than the lead of the male screw groove, there is caused a problem that assemblage becomes impossible without changing the ball size.

Means for Solving the Problem

The invention has been made in view of the problems inherent in the related art, and an object thereof is to provide a ball screw mechanism which is free from a joint in a thread groove and involves a small number of components irrespective of the fact that the ball screw mechanism can be formed easily through injection molding or the like without requiring many labor hours.

According to a first aspect of the invention, there is provided a ball screw mechanism comprising:

a screw shaft provided with a male screw groove on an outer circumferential surface thereof;

a nut disposed so as to surround the screw shaft and provided with a female screw groove on an inner circumferential surface thereof;

a plurality of balls disposed so as to freely roll along a rolling path formed between both the opposing screw grooves; and a circulating portion which is provided on either of the screw shaft and the nut for circulating the balls from one end to the other end of the rolling path, wherein the thread groove connected to the circulating portion extends round an axis of the screw shaft or the nut through 360 degrees or less and a sectional shape thereof taken at right angles to the groove includes a circular arc portion of 90 degrees or less and a connecting portion which connects to the circular arc portion at a groove bottom, and an inside diameter of the connecting portion is equal to or larger than an inside diameter of the groove bottom.

ADVANTAGES OF THE INVENTION

Taking the nut for example, in a sectional shape of the nut taken at right angles to the groove, the female screw groove has a substantially semi-circular shape. (Note that the sectional shape taken at right angles to the groove is a shape which appears when the groove is cut along a plane perpendicular to a direction in which the groove extends.) Because of this, in working using the injection molding process which utilizes a mold, in general, molding is performed by moving the mold in the axial direction with the center of the female screw groove as a parting plane. However, with the single mold, since only the female screw groove which extends round the axial direction through 360 degrees or less can be formed, in the event that the female screw groove exists along the full circumference of an internal surface of the nut, two or more parting planes (namely three or more molds) become necessary.

Alternatively, in the event that the division is made not along the thread groove but on a plane which includes the axis, a stepped portion due to a parting plane is produced, whereby there may be called for a risk that the durable life of the balls are decreased.

In contrast to this, in the ball screw mechanism of the invention, the thread groove which connects to the circulating portion extends round the axis of the screw shaft or the nut through 360 degrees or less, and the sectional shape thereof taken at right angles to the groove includes the circular arc portion of 90 degrees or less and the connecting portion which connects to the circular arc portion at the groove bottom, then inside diameter of the connecting portion being equal to or larger than the inside diameter of the groove bottom.

Since there is provided such a configuration, a mold which molds the thread groove which connects to the circulating portion can be removed simply in, for example, the axial direction after molding, and consequently, a parting plane which cuts across the groove direction of the thread groove does not have to be provided, thereby making it possible to easily form the thread groove which is free from a stepped portion.

Namely, the working of the ball screw mechanism of the invention is performed by moving the mold in a rectilinear direction. Therefore, when forming a nut, the nut can be molded altogether at a time without being divided, and a step of connecting nut parts together can be omitted which becomes necessary when the nut is divided to be formed. Furthermore, since the female screw groove which is free from a joint can be molded, there is caused no risk that the operation properties of the ball screw mechanism are deteriorated. Furthermore, not only the injection molding process but also a forging process can be adopted, thereby making it possible to produce more inexpensive nuts.

In addition, when removing the mold from a molded material, the mold or the material does not have to be rotated, and an MIM (Metal Injection Molding) is enabled by a normal injection molding machine without preparation of a special device. Furthermore, an internal circulation type circulating portion can also be molded at the same time. In addition to this, in the event that the invention is applied to a screw shaft of axial circulation type, a screw shaft which is free from a joint in an intermediate position along the length thereof can easily be molded by the mold of the MIM or the like.

The connecting portion may be rectilinear in the sectional shape taken at right angles to the groove or may be curvilinear (including a shape made up of a plurality of circular arcs) in the sectional shape taken at right angles to the groove. The joint between the connecting portion and the groove bottom is preferably smooth.

The screw groove which connects to the circulating portion can be formed one or two.

In the case of a single thread groove, the screw shaft or the nut is molded using two molds, and thereafter, the molds can be moved in the axial direction.

On the other hand, in the case of two tread grooves, circular arc portions of two thread grooves in the section taken at right angles to the groove are formed in such a manner as to approach each other in the direction of the thread shaft, and the molds each having the thread groove are moved in a direction in which they move apart from each other after molding.

The thread groove which connects to the circulating portion is formed two, and an axial distance therebetween is preferably equal to less than an axial distance of the opposing female screw groove or male screw groove.

When two thread grooves are formed only through injection molding or the like without performing finishing work, it is difficult to maintain the mutual positional relationship of oppositely opposing screw grooves with high accuracy due to variation in dimensions of parts involved.

Then, by making a distance between the two thread grooves which are formed only through injection molding or the like be equal or slightly shorter than a distance between the oppositely facing thread groove, the assemblage of the screw shaft and the nut can easily be performed without strict selection of an outside diameter for the balls. Namely, an appropriate positional tolerance which matches a working process used can be set to the relative position of the thread groove, whereby a ball fitting coefficient at the time of assemblage is enhanced without performing finishing work. Here, the "distance between the thread grooves" means a distance between bottom portions of the thread grooves (that is, an intersection between the circular arc portion and the connection portion such as the rectilinear portion) when taking the section at right angles to the groove.

However, in the event that leads of the two thread grooves which are formed only through injection molding or the like is smaller than a lead of the oppositely facing thread groove by a certain value or more, the position of the balls in the thread groove which is subjected to an axial load from an exterior portion moves out of the range of the circular arc portion. Therefore, in the event that a moment load which rotates the nut relative to the screw shaft within a plane which includes the axis is applied thereto, the load so applied cannot be borne by the circular arc portion any longer.

In the invention, however, the connecting portion such as the rectilinear portion is provided which connects to the circular arc portion Consequently, even though the thread groove comes to bear the moment load, the moment load can be borne by the connecting portion such as the rectilinear portion of the thread groove bottom, thereby making it possible to prevent a drastic reduction in life of the ball screw mechanism. This rotation preventive mechanism can increase further its advantage by increasing the relative distance (pitch) between the two thread grooves which are formed only through injection molding or the like, which is a distance equivalent to one lead in shortest, to two leads, three leads or more.

In the event that the invention is applied to a ball screw member on a side where balls circulate for assemblage, the balls which are situated in the circulating portion cannot be restrained and hence are scattered therefrom Consequently, a holding member is preferably assembled together at the same time which is disposed adjacent to at least the circulating portion so as to restrict the balls from moving in the axial direction.

The circulating portion is provided two on the nut, the other circulating portion being preferably disposed relative to one circulating portion at a phase angle of 180 degrees round the axis.

The circulating portion is a depression provided on the outer circumferential surface of the screw shaft or the inner circumferential surface of the nut, and in the event that a holding member for holding the balls is provided adjacent to at least the circulating portion, it is preferable because the balls can be prevented from being dislocated therefrom.

The holding member is preferably fittingly mounted on the nut based on the circulating portion as a positioning reference.

A fitting portion of the holding portion which fits in the nut preferably includes a shape resulting when the circulating portion of the nut is projected in the axial direction in at least part thereof.

After having been fittingly mounted on the nut, the holding member is preferably plastically deformed in the vicinity of the circulating portion.

The holding member is preferably formed by cutting a resin material or a metallic material.

The holding member is preferably formed by injection molding, sintering or forging.

The holding member is preferably formed by injection molding a resin material over a C-shaped metallic plate material.

The holding member is preferably formed by injection molding a resin material over a metallic disc on a circumferential edge of which a plurality of slits are formed.

The holding member is preferably mounted on the nut by being brought into engagement with a groove or projection which is formed on the inner circumferential surface of the nut by forging or cutting.

The holding member is preferably mounted on the nut by being brought into engagement with a groove or projection which is formed on an outer circumferential surface of the nut by forging or cutting.

The holding member is provided in a pair, whereby the holding member is preferably mounted on the nut by engagement of one of the holding members with the other of the holding members.

The holding member has a projection which corresponds to the male screw groove of the screw shaft, and it is preferable that when mounted on the nut, the projection oppositely faces the male screw groove without touching it.

The screw groove which connects to the circulating portion is preferably formed through injection molding, sintering or forging.

A ball screw mechanism assembling method of a second invention is an assembling method of a ball screw mechanism having a screw shaft on an outer circumferential surface of which an male screw groove is formed, a nut which is disposed in such a manner as to surround the screw shaft and on an inner circumferential surface of which an female screw groove is formed, a plurality of balls which are disposed in such a manner as to freely roll along a rolling path formed between both the opposing screw grooves, a circulating portion which is provided on either of the screw shaft and the nut for circulating the balls from one end to the other end of the rolling path, and a holding portion which is provided adjacent to the circulating portion and which holds the balls, wherein the thread groove which connects to the circulating portion extends round an axis of the screw shaft or the nut through 360 degrees or less and a sectional shape thereof taken at right angles to the groove includes a circular arc portion of 90 degrees or less and a connecting portion which connects to the circular arc portion at a groove bottom, an inside diameter of the connecting portion being equal to or larger than an inside diameter of the groove bottom, the method being wherein the screw shaft is inserted into an interior of the nut, and in that the holding portion is mounted after the balls are loaded in the circulating portion and the rolling path which connects to the circulating portion.

According to a technique described in Patent Document No. 4, balls are loaded using a temporary shaft when a ball screw mechanism is assembled. Because of this, the temporary shaft has to be replaced by a screw shaft in the end, leading to a problem that the number of assembling steps is increased.

In contrast to this, according to the invention, the screw shaft is inserted into the interior of the nut, and the holding portion is mounted after the balls are loaded in the circulating portion and the rolling path which connects to the circulating portion, whereby the loading of the balls can be performed without using a temporary shaft. Therefore, there is provided an advantage that the assembling work is simplified.

In the even that a configuration is adopted in which the circulating member and the holding member are provided two, respectively, and after the balls are loaded in one circulating portion and the rolling path which connects to the one circulating portion from thereabove in a gravity direction and the holding member is assembled, the nut and the screw shaft are inverted in the gravity direction, so that the balls are loaded in the other circulating portion and the rolling path which connects to the other circulating portion from thereabove in the gravity direction and the holding member is assembled, an increase in efficiency of the assembling work can be realized.

A ball screw mechanism assembling method of a third invention is an assembling method of a ball screw mechanism having a screw shaft on an outer circumferential surface of which an male screw groove is formed, a nut which is disposed in such a manner as to surround the screw shaft and on an inner circumferential surface of which an female screw groove is formed, a plurality of balls which are disposed in such a manner as to freely roll along a rolling path formed between both the opposing screw grooves, a circulating portion which is provided on either of the screw shaft and the nut for circulating the balls from one end to the other end of the rolling path, and a holding portion which is provided adjacent to the circulating portion and which holds the balls, wherein the thread groove which connects to the circulating portion extends round an axis of the screw shaft or the nut through 360 degrees or less and a sectional shape thereof taken at right angles to the groove includes a circular arc portion of 90 degrees or less and a connecting portion which connects to the circular arc portion at a groove bottom, an inside diameter of the connecting portion being equal to or larger than an inside diameter of the groove bottom, the method being wherein a temporary shaft is inserted into an interior of the nut, in that the holding portion is mounted after the balls are loaded in the circulating portion and the rolling path which connects to the circulating portion, in that the screw shaft is connected to the temporary shaft, and in that after the screw shaft is drawn into the interior of the nut while the temporary shaft and the screw shaft are being rotated, the temporary shaft and the screw shaft are disconnected from each other.

The ball screw mechanism may be assembled using the temporary shaft in this way. By this configuration, the occurrence of a damage to the screw shaft at the time of assemblage can be suppressed.

It is preferable that the circulating member and the holding member are provided two, respectively, and that after the balls are loaded in one circulating portion and the rolling path which connects to the one circulating portion from thereabove in a gravity direction and the holding member is assembled, the nut and the temporary shaft are inverted in the gravity direction, so that the balls are loaded in the other circulating portion and the rolling path which connects to the other circulating portion from thereabove in the gravity direction and the holding member is assembled.

BRIEF DESCRIPTION OF THE DRAWINGS

FIGS. 20A through 20G are drawings which explain another assembling method of the ball screw mechanism according to the embodiment.

FIG. 29A is a drawing of a holding member 14 according to another modified example as seen in an axial direction from an inside of a nut.

FIG. 29B is an axially sectional view of the holding member 14.

FIG. 29C is a drawing of the holder 14 as seen in the axial direction from an outside of the nut.

Figure 1:
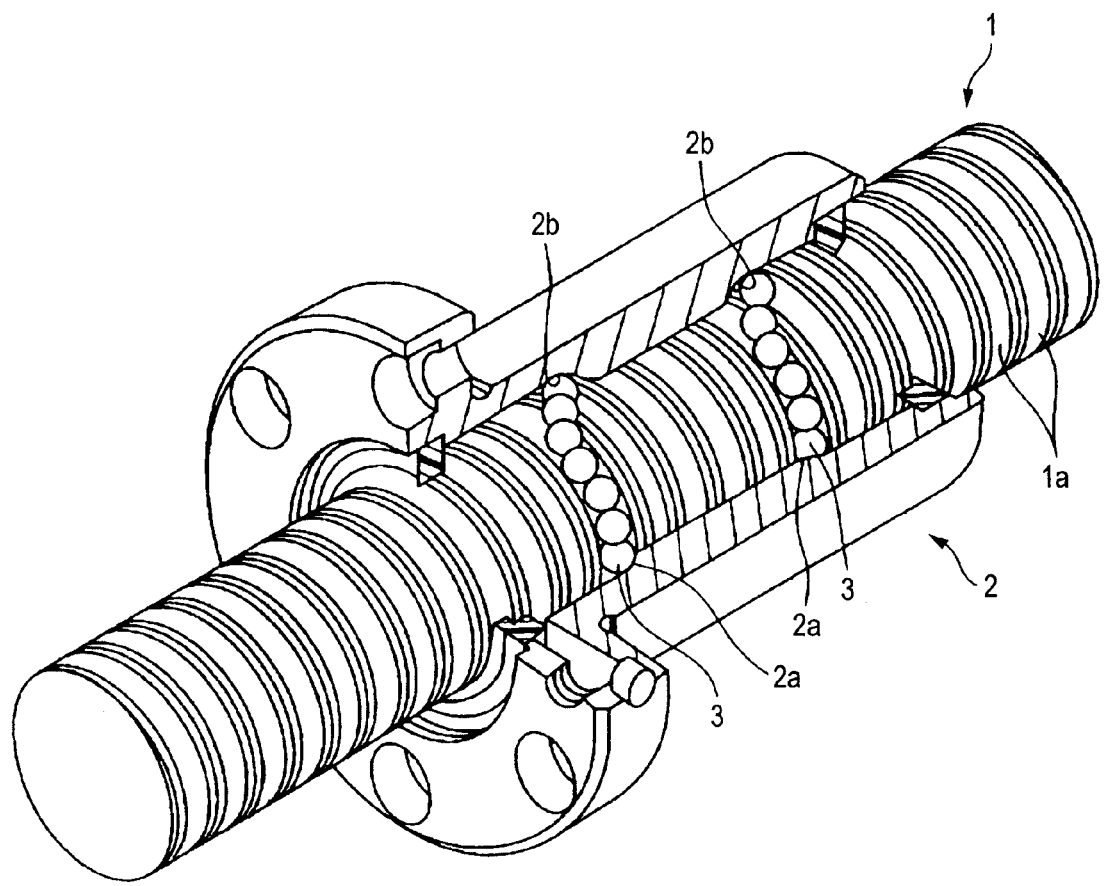
FIG. 1 is a partially cutaway perspective view of a ball screw mechanism of an embodiment.

DESCRIPTION OF REFERENCE NUMERALS 1 screw shaft;
1a male screw groove;
2, 2A, 12 nut;
2b 12b circulating portion;
2c, 12c circular arc portion;
2d, 12d rectilinear portion;
2e circumferential groove;
3 ball;
4, 14 holding member;
14a large cylindrical portion;
14b small cylindrical portion;
14c central opening;
14d female screw groove;
14e projection

BEST MODE FOR CARRYING OUT THE INVENTION

Next, embodiments of the invention will be described by reference to the drawings. FIG. 1 is a partially cutaway view of a ball screw mechanism of an embodiment. In FIG. 1, an male screw groove 1a is formed on an outer circumferential surface of a screw shaft 1 which is connected to a driven member and is supported in such a manner as not to rotate but to move only in an axial direction.

A cylindrical nut 2, which is supported in such a manner as to only rotate relative to a housing, not show, is disposed in such a manner as to surround the screw shaft 1, and female screw grooves 2a (here, two female screw grooves which extend slightly less than a turn round the nut) are formed on an inner circumferential surface thereof. A plurality of balls 3 are disposed in such a manner as to freely roll within a spiral rolling path defined between both the oppositely opposing screw grooves. Circulating portions 2b are formed on the inner circumferential surface of the nut 2 in such a manner as to connect ends of the female screw grooves 2a, respectively.

Figure 4:
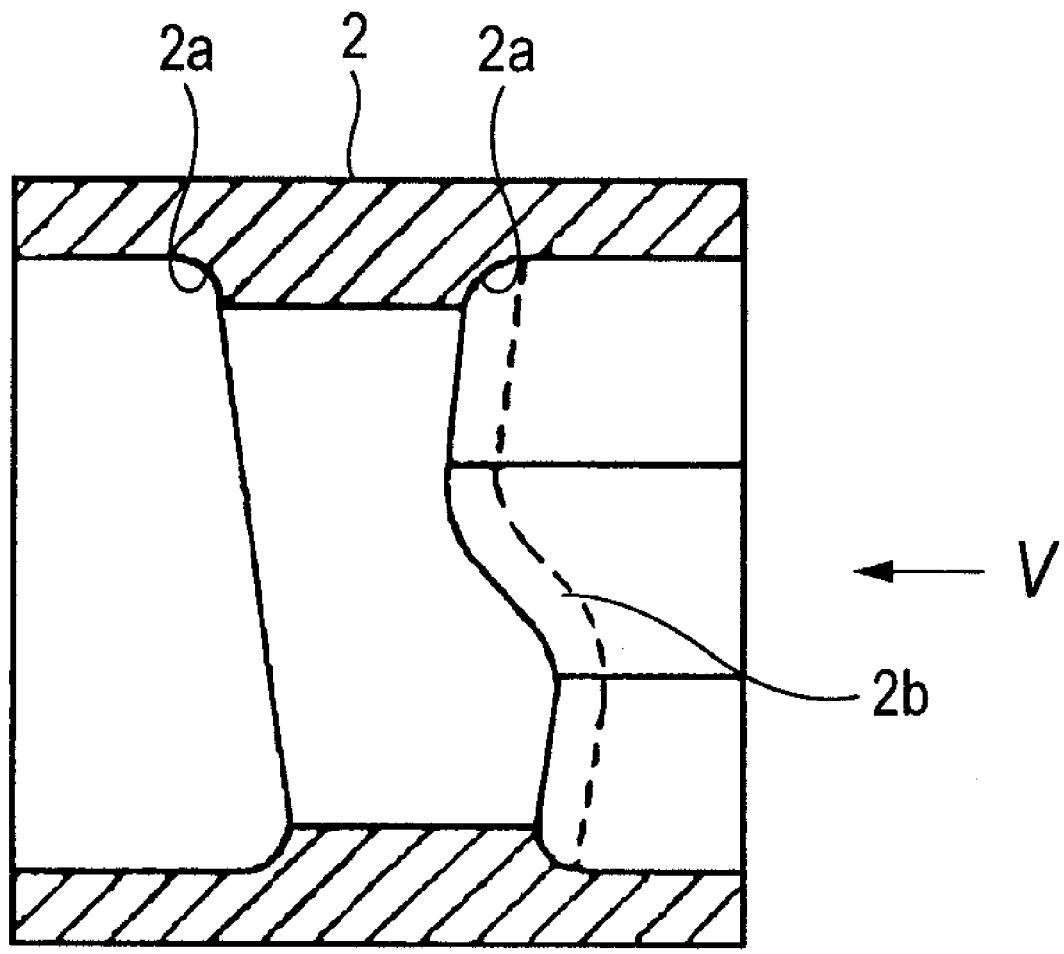
FIG. 4 is a sectional view of the nut of the embodiment alone.
Figure 5:
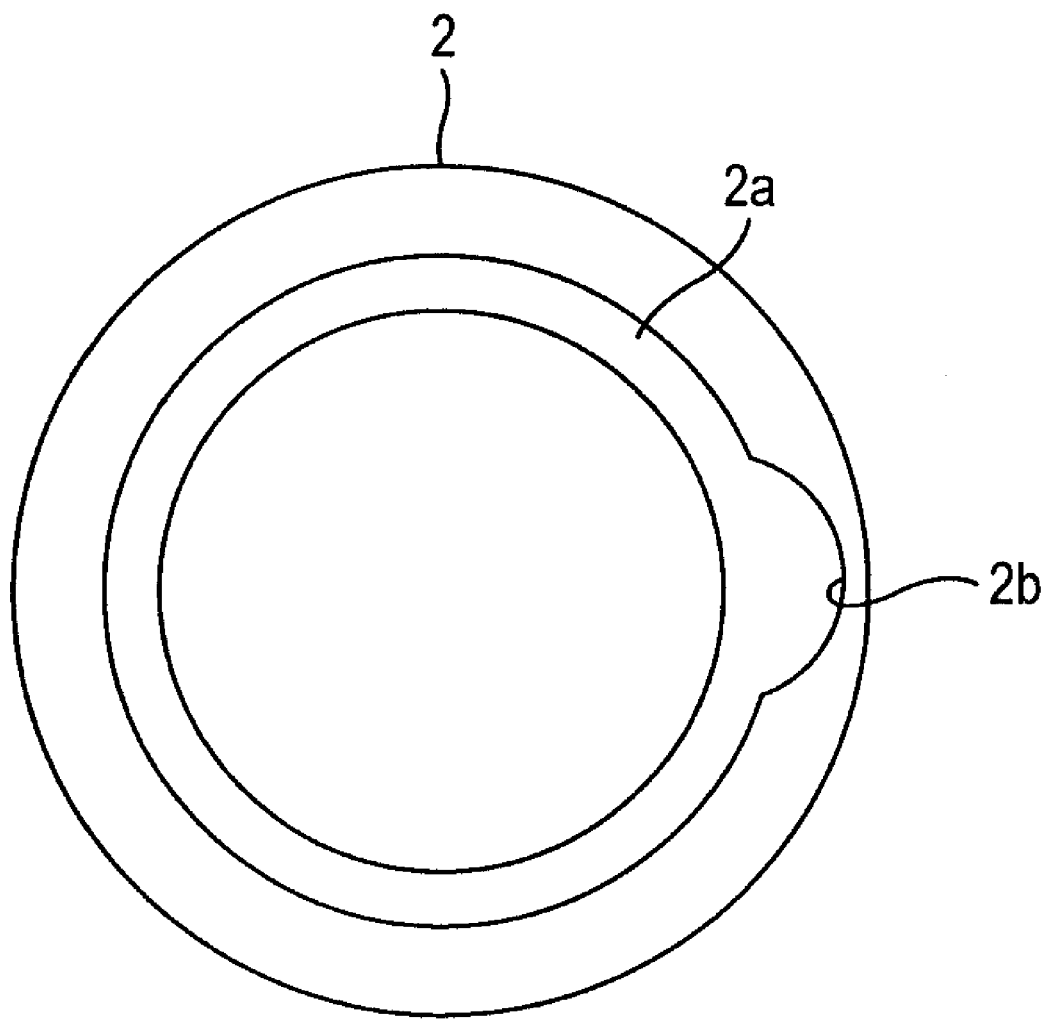
FIG. 5 is a view of the nut in FIG. 4 as seen in a direction indicated by an arrow V.

As is shown in FIGS. 4, 5, the circulating portion 2b makes use of part of a groove (depression) of a circular arc-like cross section which is formed in such a manner as to gouge the inner circumferential surface of the nut 2 and which extends in an axial direction. Here, the female screw groove 2a is a thread groove in which the circulating portion is formed, and a shape thereof will be described later on.

Figure 2:
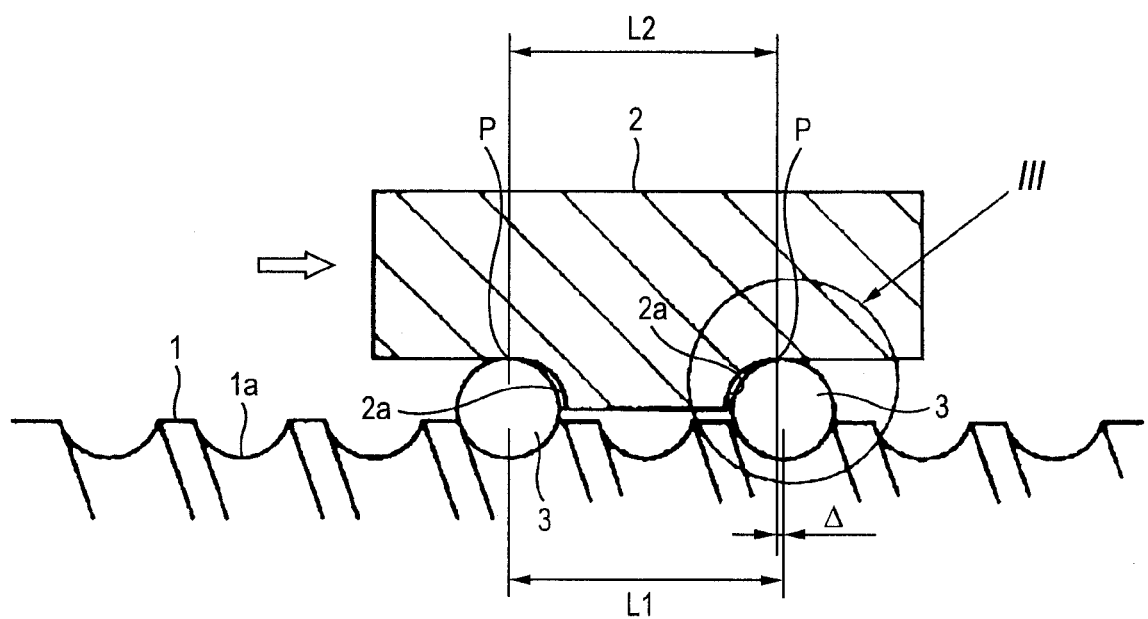
FIG. 2 is an axially sectional view which shows the periphery of a nut of the embodiment in a simplified fashion.
Figure 3:
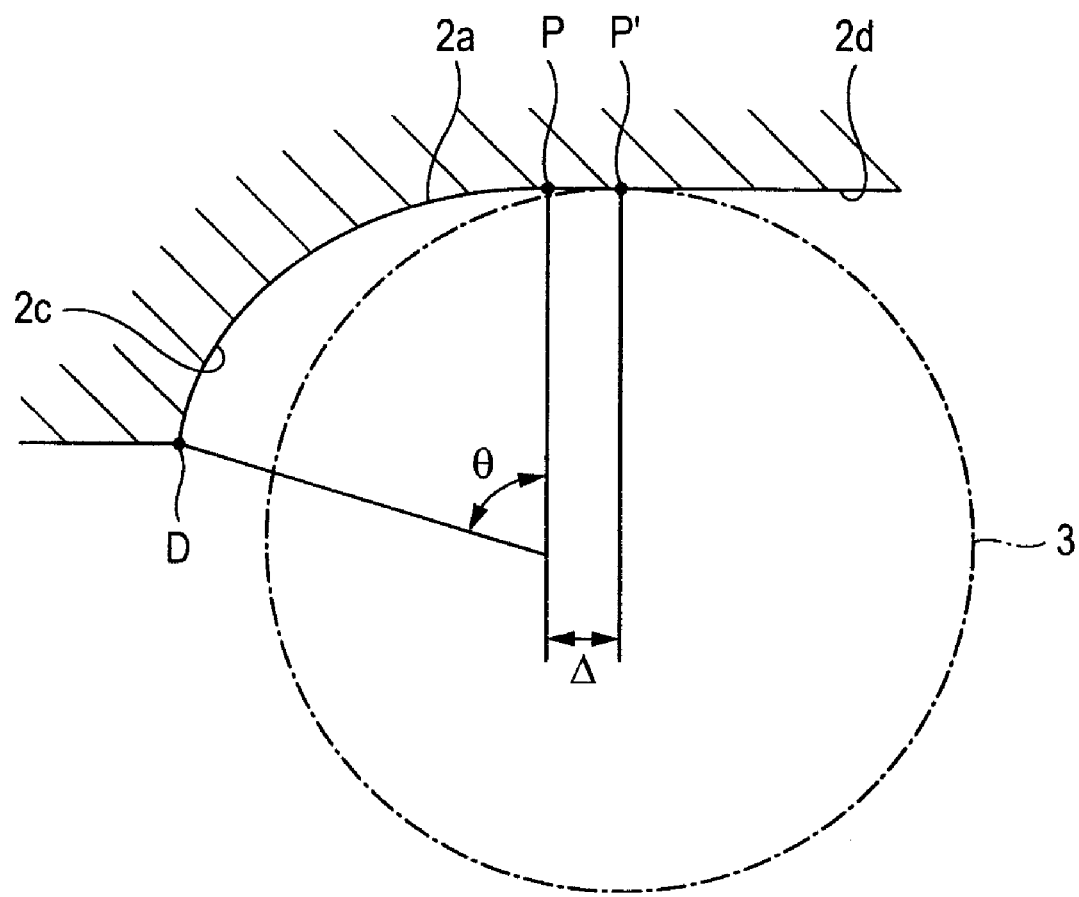
FIG. 3 is a drawing showing in an enlarged fashion a portion indicated by an arrow III in FIG. 2 in a section taken at right angles to a groove.

Although FIG. 2 is an axially sectional view which shows the periphery of the nut of the embodiment in a simplified fashion, a flange and the like are omitted (hereinafter, the same will be true). FIG. 3 is a drawing which shows in an enlarge fashion a portion indicated by an arrow III in FIG. 2 in a section taken at right angles to the groove. FIG. 4 is a sectional view of the nut alone, and FIG. 5 is a drawing of the nut shown in FIG. 4 as seen in a direction indicated by arrows.

As is shown in FIG. 3, when taking a section of the nut 2 at right angles to the groove, the internal thread 2a is made up of a circular arc portion 2c whose circular arc angle $\theta=90$ degrees or less and a rectilinear portion 2d. This rectilinear portion 2d is a connecting portion which connects at a bottom portion P of the female screw groove 2a (also referred to as a terminating end of the circular arc, a groove bottom) and extends in parallel with an axis. A boundary point between the circular arc portion 2c and the rectilinear portion 2d may not strictly coincide with a center of balls 3 which pass therethrough but may be substantially in the vicinity of the center. In addition, the rectilinear portion 2d does not necessarily have to be in parallel with the axis, and although a draft of within five degrees may be imparted, an inside diameter thereof is equal to or larger than an inside diameter of the bottom portion P.

As is shown in FIG. 2, in this embodiment, the two female screw grooves 2a, 2a are disposed in such a manner as to become a mirror image relative to each other so that respective circular arc portions 2c, 2c (FIG. 3) thereof approach each other in a direction of the screw shaft. In addition, an axial distance L2 between the bottom portions P, P of the female screw grooves 2a, 2a is made to be equal to or less than an axial distance L1 of the male screw groove 1a which the female screw grooves 2a, 2a oppositely face. Here, the position of the halls 3 which pass through the female screw grooves 2a, 2a is restricted by the male screw groove 1a. Consequently, when the ball screw mechanism is activated, the balls 3, which roll along the female screw groove 2a which lies on a side where thrust load is not applied, roll while contacting a point P' on the rectilinear portion 2d which is axially spaced apart from the bottom portion P by a distance $\Delta = L1-L2$ (refer to FIG. 3).

To describe the operation of the embodiment, when the nut 2 is driven to rotate by an electric motor, not shown, the balls 3 roll through a rolling path defined by the male screw groove 1a and the female screw groove 2a and circulate from one end to the other end of the rolling path via the circulating portion 2b. This rotational motion is converted to a linear motion along the axis of the screw shaft 1 with good efficiency, thereby making it possible to move axially the driven member, not shown, which is connected to the screw shaft 1.

In this embodiment, the axial distance L2 between the two female screw grooves 2a, 2a is set to be shorter than the axial distance L1 of the facing external groove 1a by the distance Δ. By this configuration, the assemblage of the screw shaft 1 and the nut 2 can be facilitated without strictly selecting an outside diameter for the balls 3.

When the nut 2 bears a moment load in a direction in which the nut 2 rotates relative to the screw shaft 1 within a plane which includes the axis, the balls 3 are brought into abutment with the rectilinear portion 2d of the female screw groove 2a which lies on a side which bears no thrust load, thereby making it possible to bear the moment load.

In addition, since the circulating portion, which circulates the balls 3 from one end to the other end of the rolling path, is formed in the nut 2, other circulating members such as a top and a tube do not have to be provided, whereby the number of parts involved is decreased, and a reduction in cost can be realized.

Figure 21A:
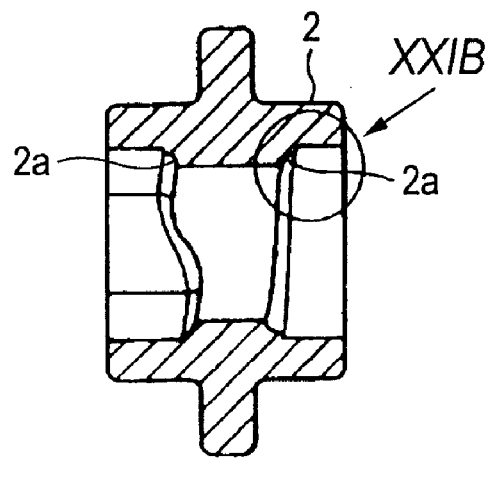
FIG. 21A is a sectional view of a nut according to a modified example of the embodiment.
Figure 21B:
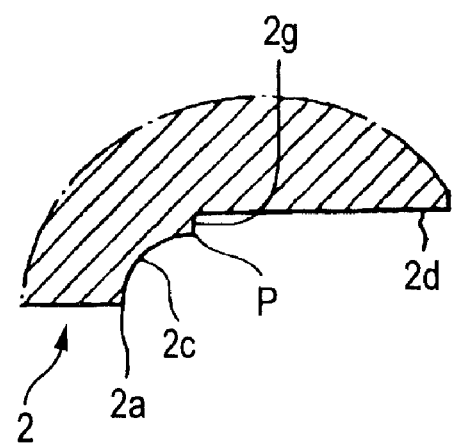
FIG. 21B is a drawing showing in an enlarged fashion a portion indicated by an arrow XXIB of the configuration shown in FIG. 21A in a section taken at right angles to a groove.

FIG. 21A is a sectional view of a nut according to a modified example of the embodiment, and FIG. 21B is a drawing which shows in an enlarged fashion a portion indicated by an arrow XXIB of the configuration shown in FIG. 21A in a section taken at right angles to a groove.

In FIG. 21, when taking a section of the nut at right angles to the groove, an female screw groove 2a is made up of a circular arc portion 2c whose circular arc angle θ=90 degrees or less, a radial surface 2g which connects to the circular arc portion 2c at a bottom portion P of the female screw groove 2a and extends in a radius direction and a cylindrical portion 2d which connects to the radial surface 2g and extends in parallel with the axis. The radial surface 2g and the cylindrical portion 2d makeup a connecting portion. An inside diameter of the bottom portion P is smaller than an inside diameter of the cylindrical portion 2d whose inner circumferential section is rectilinear.

Figure 22A:
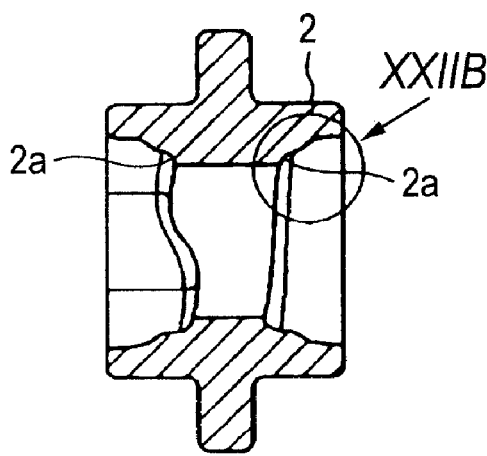
FIG. 22A is a sectional view of a nut according to another modified example of the embodiment.
Figure 22B:
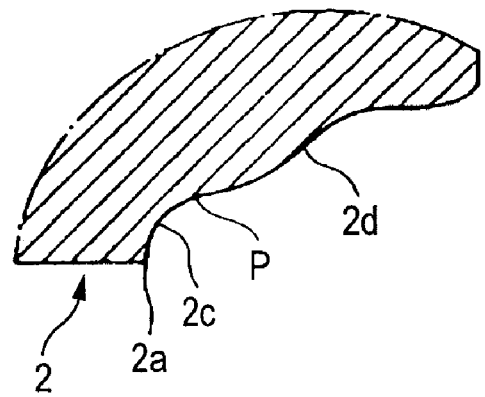
FIG. 22B is a drawing showing in an enlarged fashion a portion indicated by an arrow XXIIB of the configuration shown in FIG. 22A in a section taken at right angles to a groove.

FIG. 22A is a sectional view of a nut according to another modified example of the embodiment, and FIG. 22B is a drawing which shows in an enlarged fashion a portion indicated by an arrow XXIIB of the configuration shown in FIG. 22A in a section taken at right angles to a groove. In FIG. 22, when taking a section of the nut at right angles to the groove, an female screw groove 2a is made up of a circular arc portion 2c whose circular arc angle θ=90 degrees or less and a connecting portion 2d which connects to the circular arc 2c at a bottom portion P of the female screw groove 2a and which is made up of a plurality of circular arcs which have an arbitrary radius of curvature. An inside diameter of the bottom portion P is smaller than an inside diameter of the connecting portion 2d.

Figure 23A:
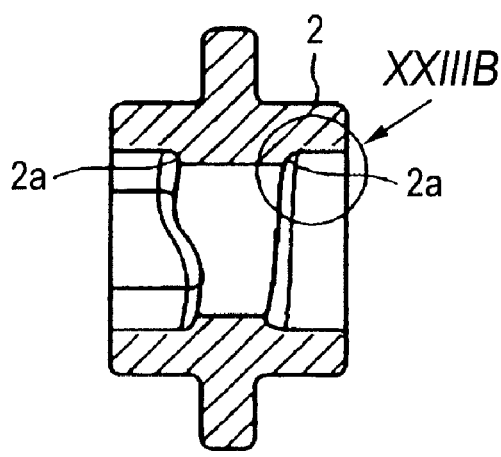
FIG. 23A is a sectional view of a nut according to another modified example of the embodiment.
Figure 23B:
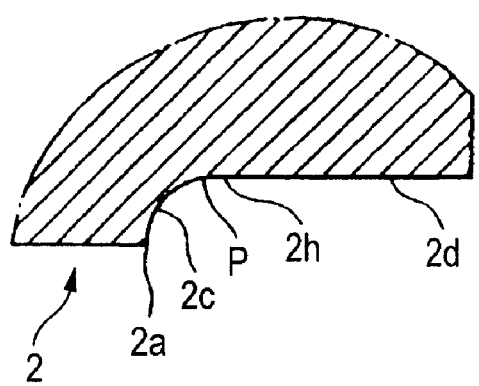
FIG. 23B is a drawing showing in an enlarged fashion a portion indicated by an arrow XXIIIB of the configuration shown in FIG. 23A in a section taken at right angles to a groove.

FIG. 23A is a sectional view of a nut according to a modified example of the embodiment, and FIG. 23B is a drawing which shows in an enlarged fashion a portion indicated by an arrow XXIB of the configuration shown in FIG. 23A in a section taken at right angles to a groove.

In FIG. 23, when taking a section of the nut at right angles to the groove, an female screw groove 2a is made up of a circular arc portion 2c whose circular arc angle θ=90 degrees or less, a circular arc portion 2h of a large radius of curvature which connects to the circular arc portion 2c at a bottom portion P of the female screw groove 2a and a rectilinear portion 2d which connects to the circular arc portion 2h and extends in parallel with the axis. The circular arc portion 2h and the rectilinear portion 2d makeup a connecting portion. An inside diameter of the bottom portion P is smaller than inside diameters of the circular arc portion 2h and the rectilinear portion 2d.

Figure 6:
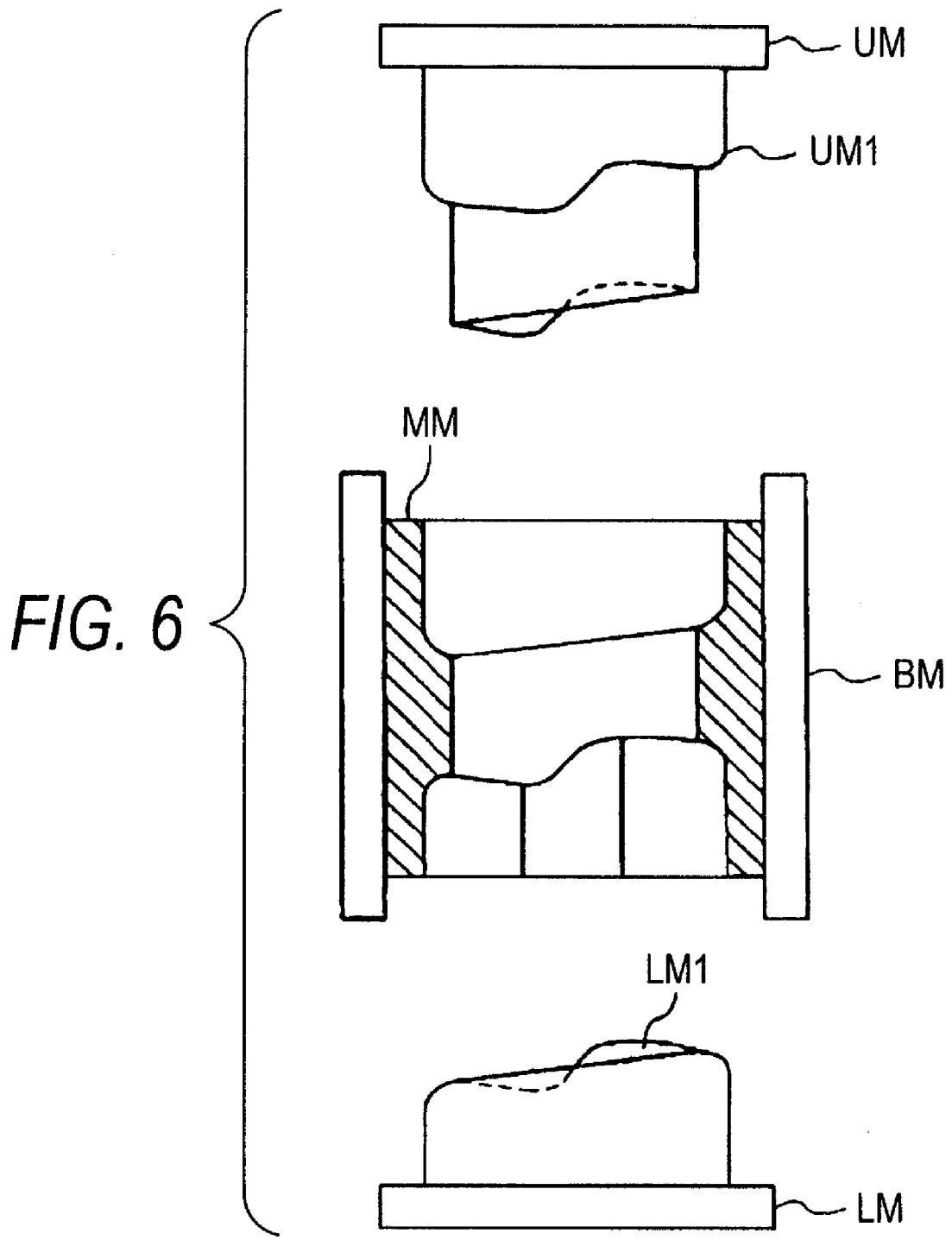
FIG. 6 is a drawing showing a manufacturing process of the nut according to the embodiment.

FIG. 6 is a drawing showing a manufacturing process of the nut according to the embodiment and shows a state resulting after a mold is removed. In FIG. 6, a projecting portion LM1 which has a shape corresponding to the female screw groove 2a is formed on a lower mold LM. On the other hand, similarly, a projecting portion UM1 which has a shape corresponding to the female screw groove 2a is formed on an upper mold UM. The lower mold LM is inserted from one end portion side of a tubular barrel mold BM, while the upper mold UM is inserted from the other end portion side, and thereafter, sintering metallic powder MM is injected to be loaded into an interior space of the mold from a gate, not shown. By heating the metallic powder together with the molds to a predetermined temperature while the aforesaid state is maintained, a nut 2 can be molded.

According to the embodiment, since the female screw groove 2a of the nut 2 extends round the axis of the nut 2 through 360 degrees or less and the section thereof taken at right angles to the groove is made to be made up of the circular arc portion 2c of 90 degrees or less and the rectilinear portion 2d which connects to the circular arc portion at the bottom of the groove and extends in parallel with the axis, the lower mold LM and the upper mold UM can simply be removed axially from the barrel mold BM after molding is completed. In this case, since a parting plane of the molds can be positioned axially further inwards than an end portion D of the circular arc portion 2c in FIG. 3, the division of the female screw groove 2a along the parting plane can be avoided, thereby making it possible to form easily the female screw groove 2a which is free from a difference in level or a stepped portion.

Incidentally, referring to FIG. 5, since an end portion of the circulating portion 2b, which is a groove of a circular arc-like section which extends in the axial direction, is exposed to an end face of the nut 2, there exists a risk that the balls 3 which pass the relevant end portion fall therefrom. The problem can be solved according to the following modified example.

Figure 7:
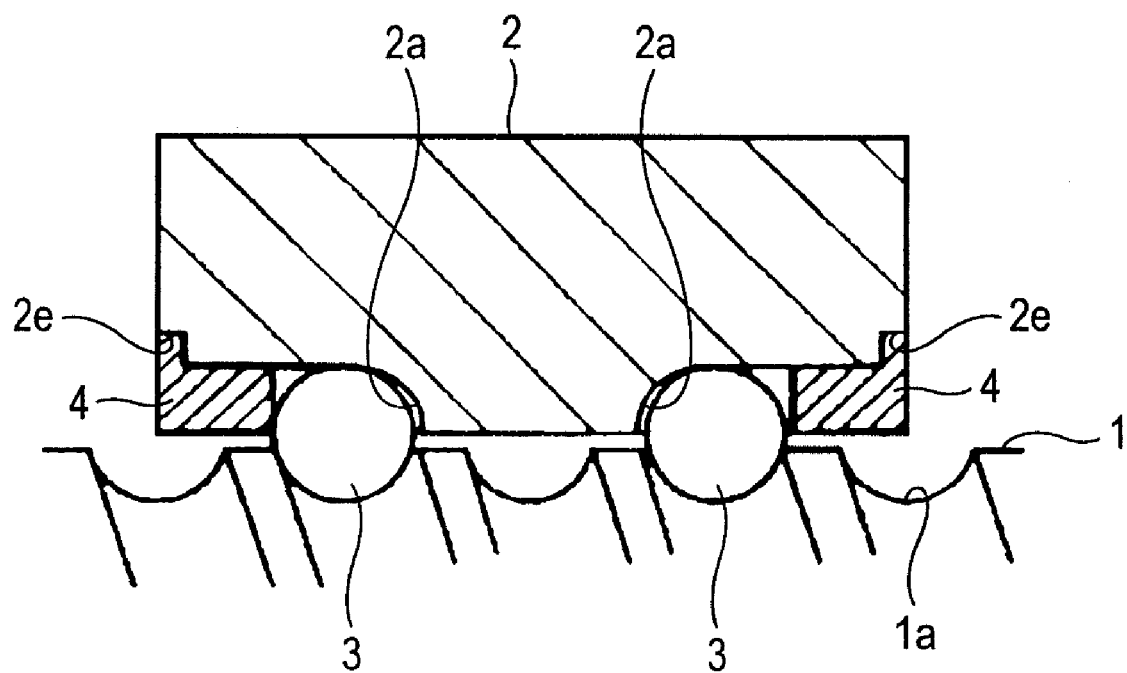
FIG. 7 is a sectional view of a nut according to a modified example of the embodiment.

FIG. 7 is a sectional view of a nut according to a modified example of the embodiment. In this modified example, annular holding members 4, 4 are mounted in circumferential grooves 2e, 2e which are formed on inner circumferences of both ends of the nut 2 from outside in the axial direction.

An inside diameter of the holding member 4 and an inside diameter of the nut 2 are made to be so small, at least at the circulating portion, that they coincide with a central position of balls 3 at the time of assemblage or they are kept out of abutment with the screw shaft 1. By this configuration, the operation while the balls are circulating can be made smooth. For this holding member 4, a resin injection molded product and an MIM or sintered product by a metallic material can be adopted. In addition, as a fixing method of the holding member 4, methods such as crimping and bonding can be adopted so as to realize a reduction in costs. Since the holding members 4, 4 are good enough in case they can cover at least the circulating portions 2b, 2b, the holding portions do not have to be provided all along the full circumference of the circumferential edges. However, by providing the holding members along the full circumference of the circumferential edges in such a manner as to be in sliding contact with the external threaded portion 1a, a sealing function may be imparted.

The ball screw mechanism according to the embodiment that has been described heretofore is effective when the screw shaft 1 and the nut 2 are subjected to relative load in both directions, or when the nut 2 is subjected to moment load in the direction in which the nut 2 rotates relative to the screw shaft 1 within the plane which contains the axis. In contrast to this, in the event that only either of the screw shaft 1 and the nut 2 is subjected to relative load and that the nut 2 is not subjected to moment load in the direction in which the nut 2 rotates relative to the screw shaft 1 within the plane which contains the axis, a more simplified configuration can be provided.

Figure 8:
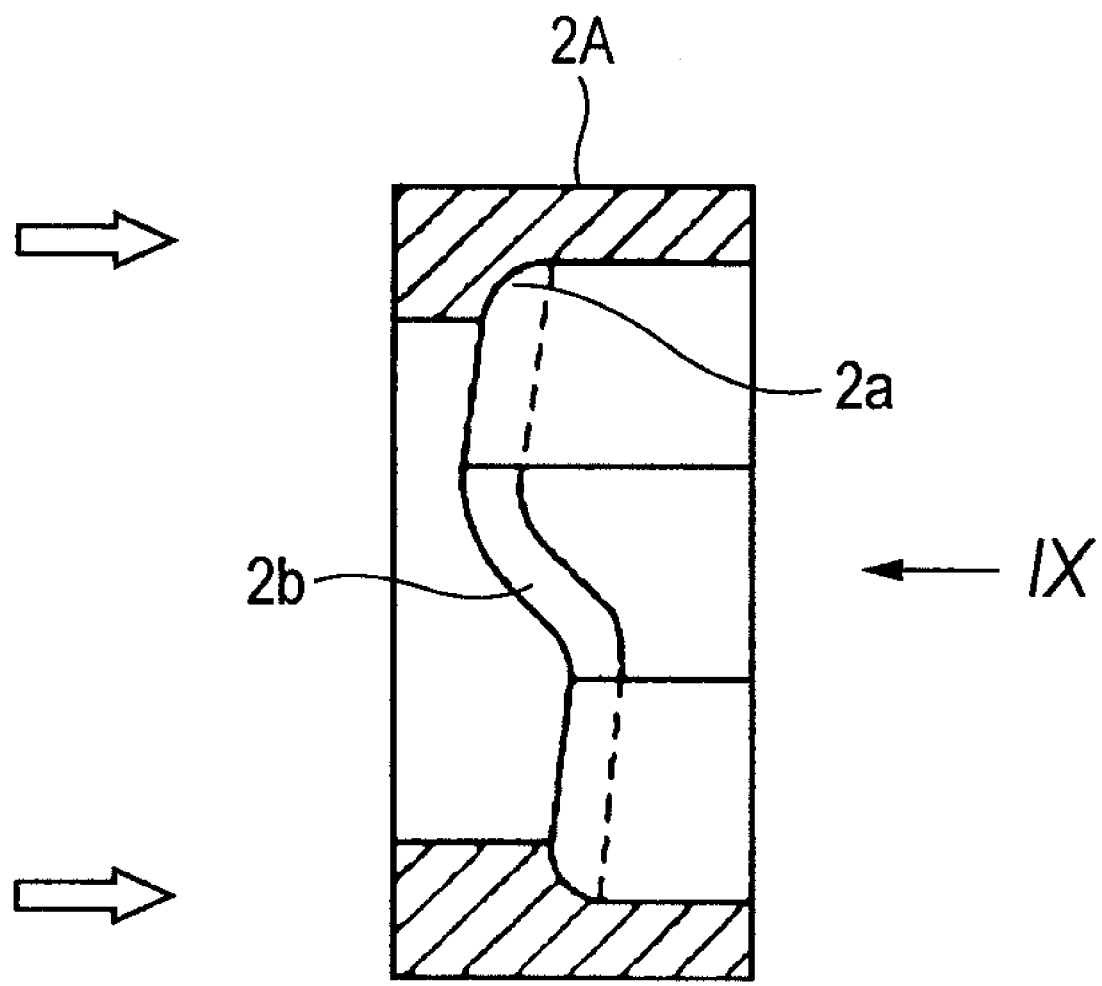
FIG. 8 is a sectional view of a nut alone according to another embodiment.
Figure 9:
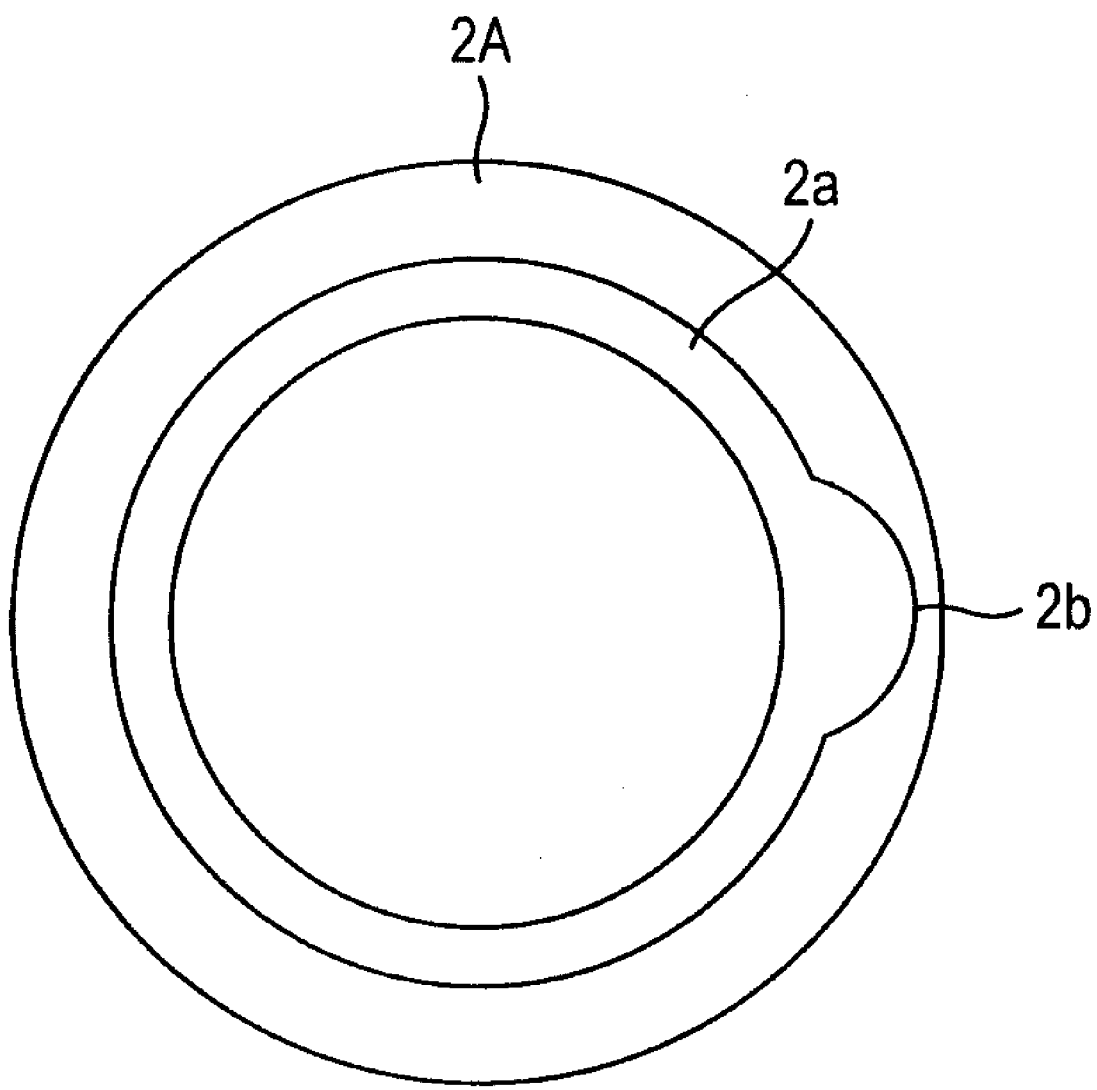
FIG. 9 is a view of the nut in FIG. 8 as seen in a direction indicated by an arrow IX.

FIG. 8 is a sectional view of a nut alone according to another embodiment, and FIG. 9 is a view of the nut in FIG. 8 as seen in a direction indicated by an arrow IX.

In this embodiment, a nut has a shape which would result when the nut 2 is divided into two halves in the axial direction, and in fact, only a single female screw groove 2a is formed on the nut 2A. The other configurations including the shape of the female screw groove 2a are similar to those of the embodiment that has been described above, and therefore, the description thereof will be omitted.

In the event that a ball screw mechanism is made by incorporating the nut 2A according to the embodiment in the screw shaft 1, the resulting ball screw mechanism can be used for an application in which load is borne only in a direction indicated by arrows in FIG. 8.

Figure 10:
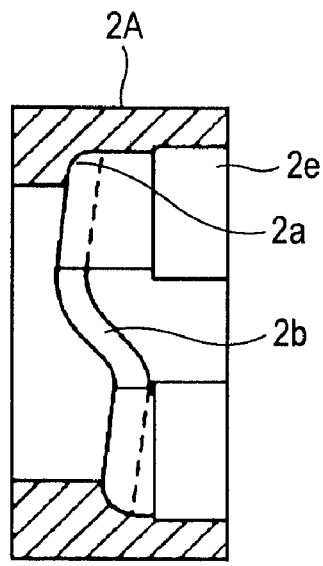
FIG. 10 is a sectional view of a nut main body according to a modified example.

FIG. 10 is a sectional view of a nut main body according to a modified example. In this modified example, a circumferential edge 2e' for mounting the holding member shown in FIG. 7 is formed on an inner circumference of an end portion of a nut 2A.

Figure 11:
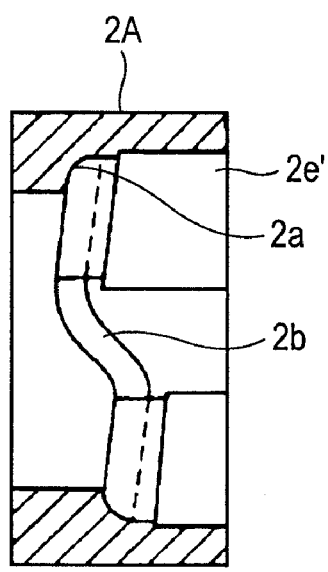
FIG. 11 is a sectional view of a nut main body according to another modified example.

FIG. 11 is a sectional view of a nut main body according to another modified example. In this modified example, a circumferential edge 2e' for mounting the holding member is formed on the inner circumference of the end portion of the nut 2A in such a manner as to extend along an female screw groove 2a.

Figure 12:
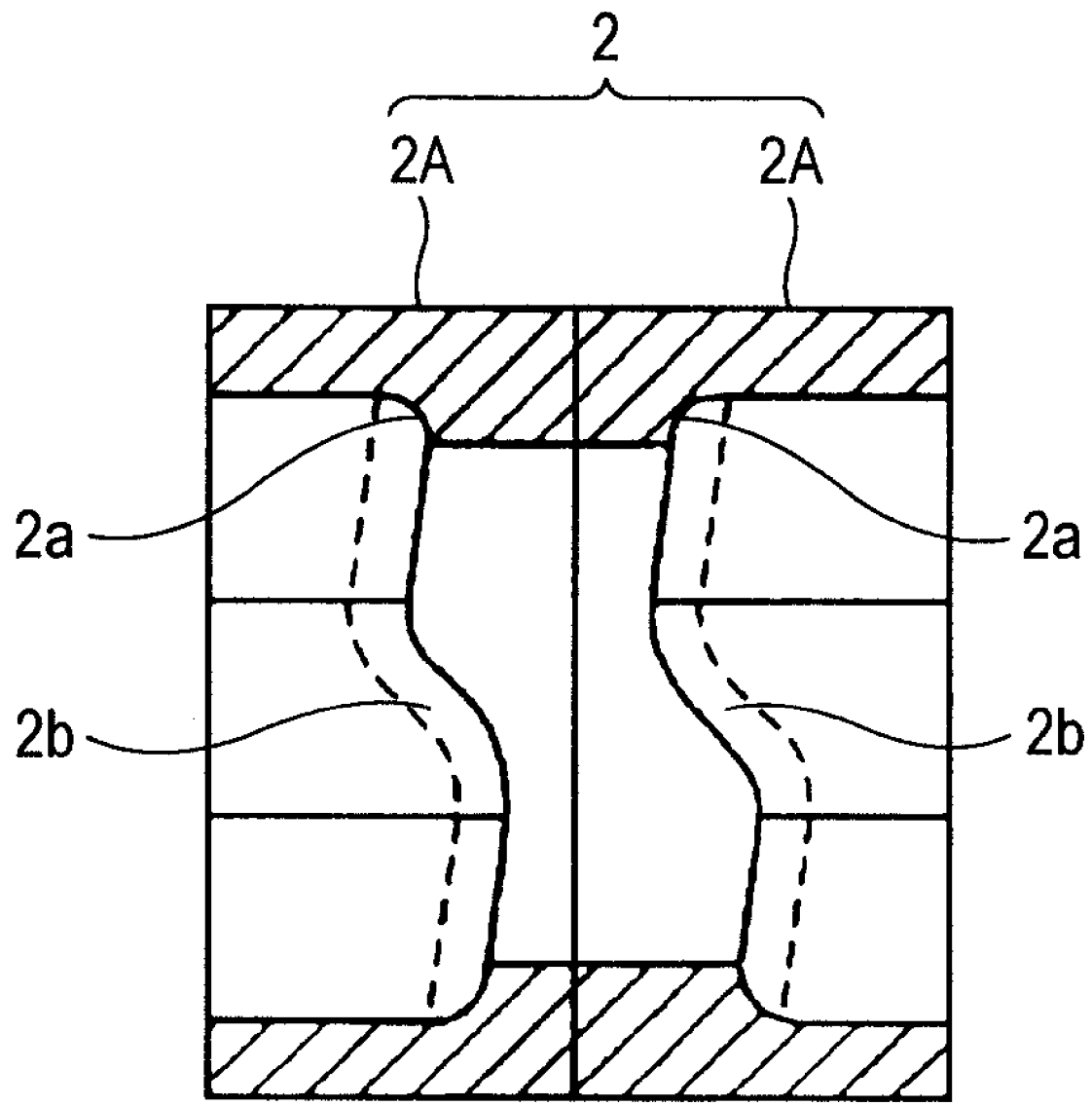
FIG. 12 is a sectional view of a nut which is made up by combining the nuts 2A, 2A shown in FIG. 8 in such a manner that they face each other in an axial direction.

FIG. 12 is a sectional view of a nut which is made up by combining the nuts 2A, 2A shown in FIG. 8 in such a manner that they face each other in an axial direction. Namely, in case nuts 2A, 2A, which are injection molded individually, are combined together to form a nut 2, there can be provided a ball screw mechanism which can preferably deal with a case in which the screw shaft 1 and the nut 2 are subjected to relative load in both directions, or a case in which the nut 2 is subjected to moment load in a direction in which the nut 2 rotates relative to the screw shaft 1 within a plane which contains the axis. However, although a means (an adhesive, a bolt connection, accommodation in a housing or the like) for connecting together end faces of the nuts 2A, 2A is necessary, since the female screw groove 2a is not divided, a highly accurate alignment is not necessary.

Figure 13:
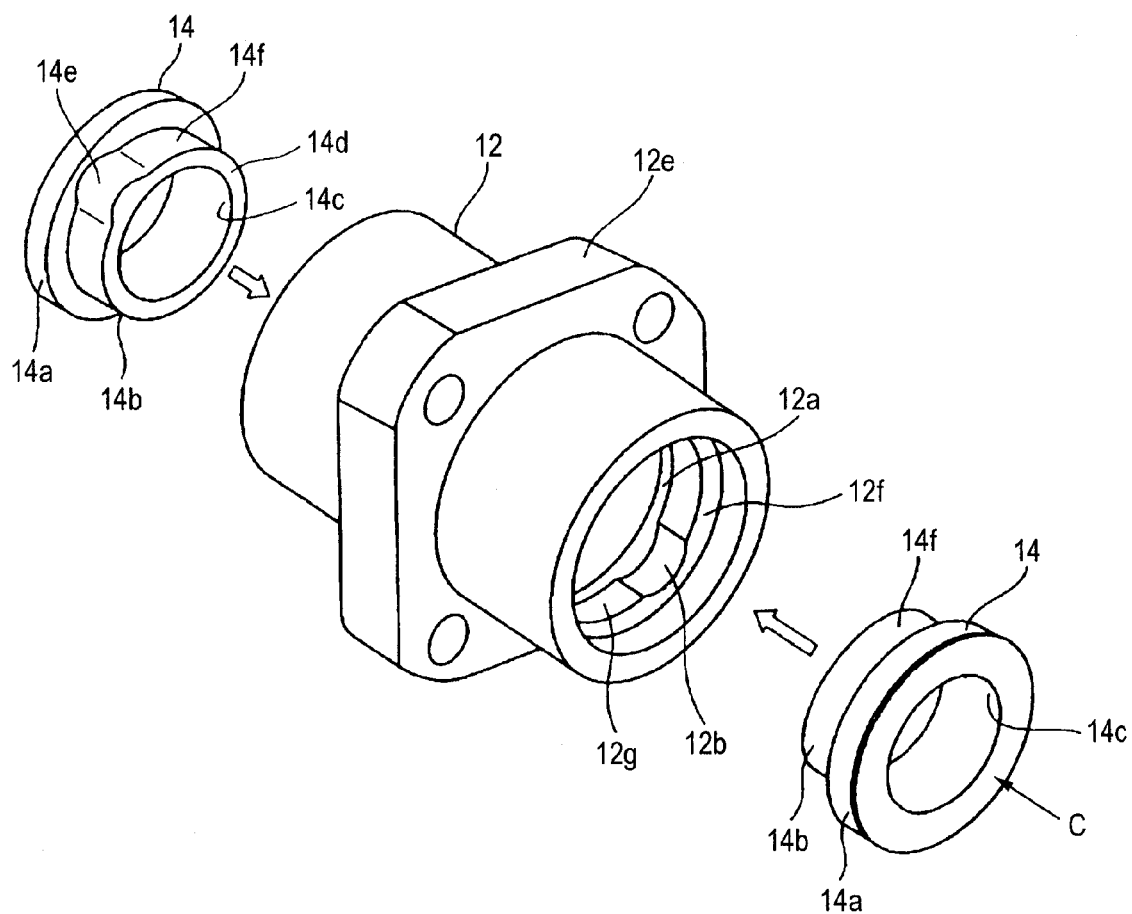
FIG. 13 is an exploded perspective view of a ball screw mechanism according to a further embodiment, with a screw shaft and balls omitted.
Figure 14:
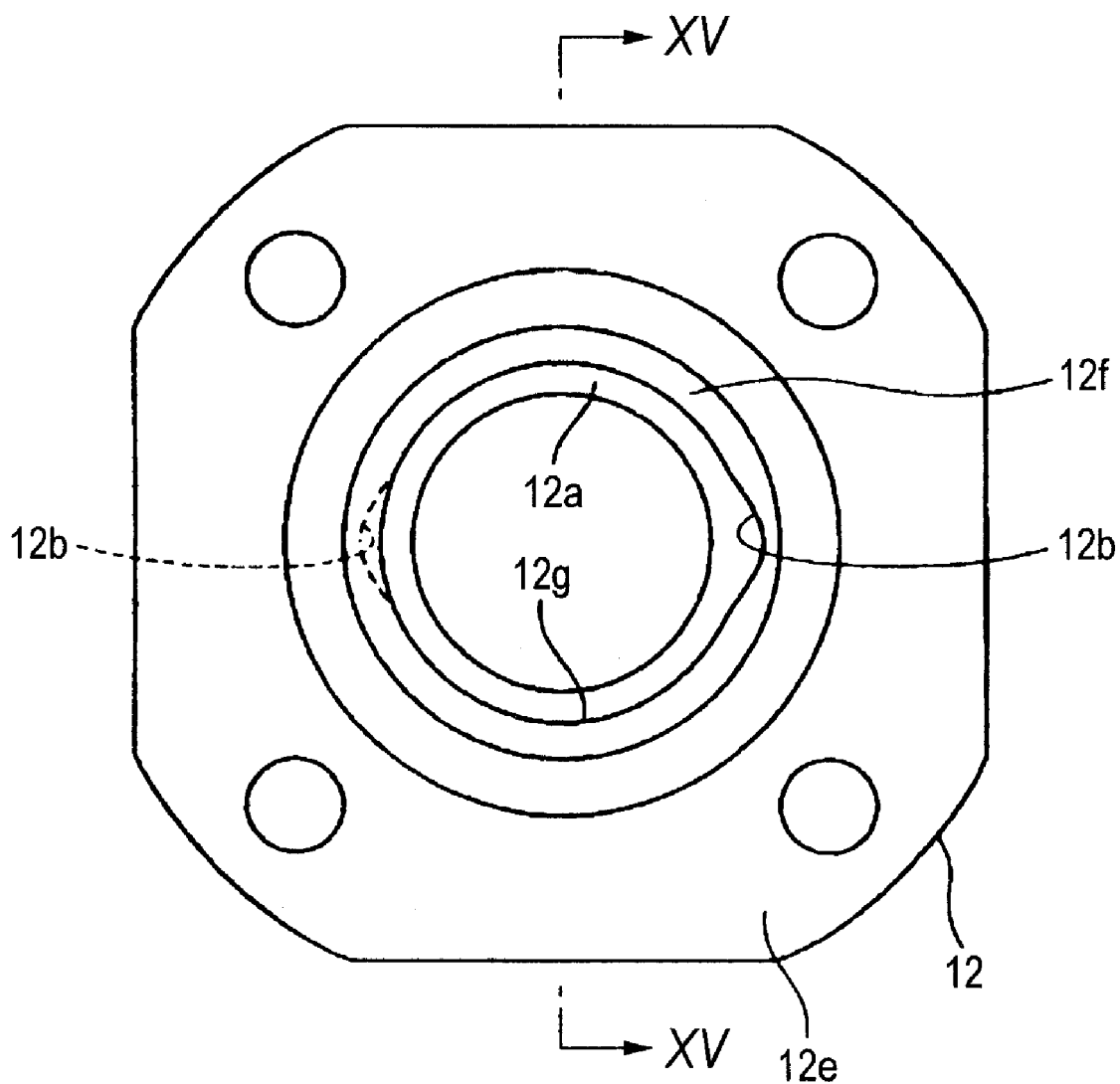
FIG. 14 is a drawing of a nut 12 as seen in an axial direction.
Figure 15:
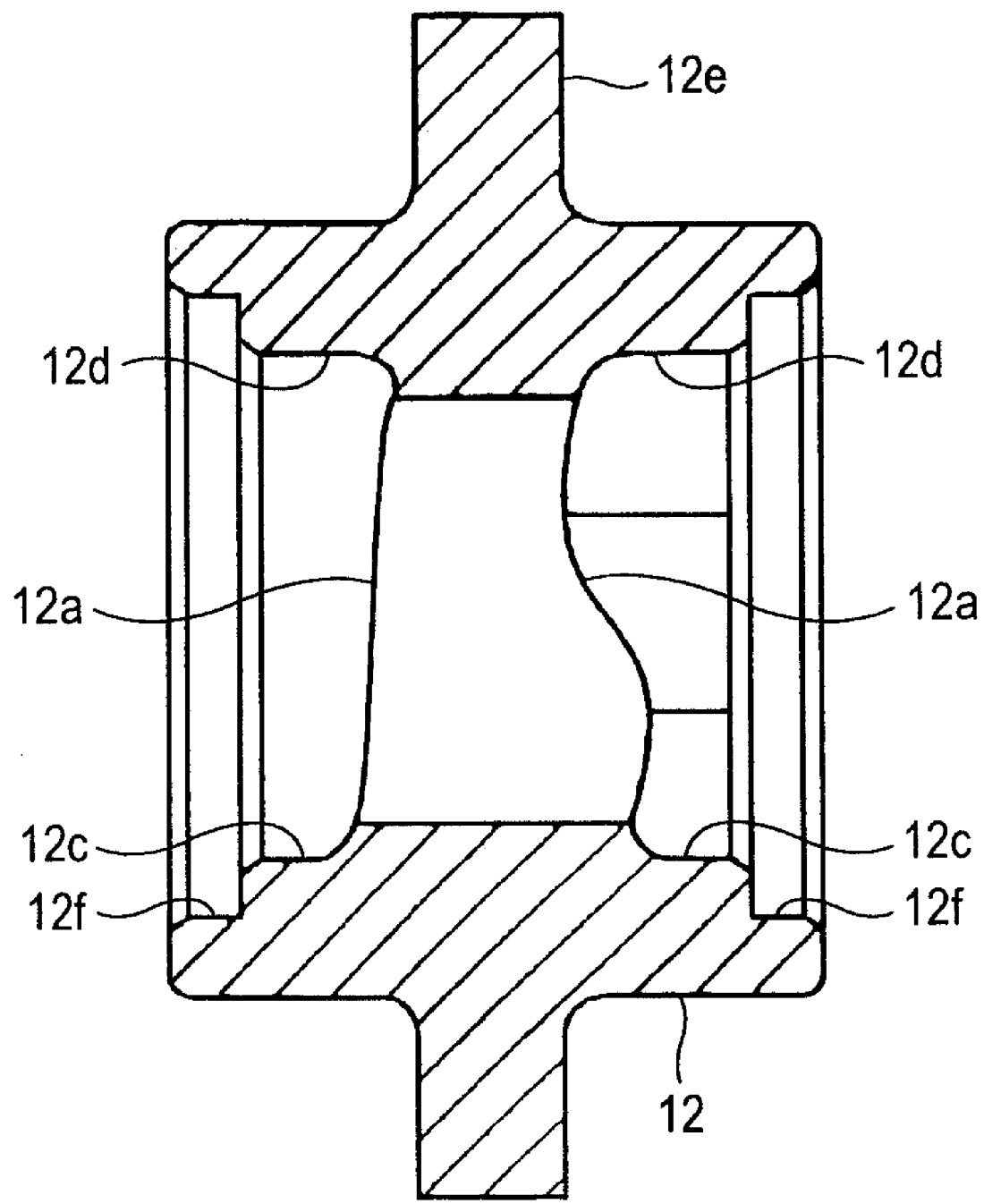
FIG. 15 is a drawing of the nut 12 in FIG. 14 as taken along the line XV-XV and viewed in a direction indicated by arrows.
Figure 16:
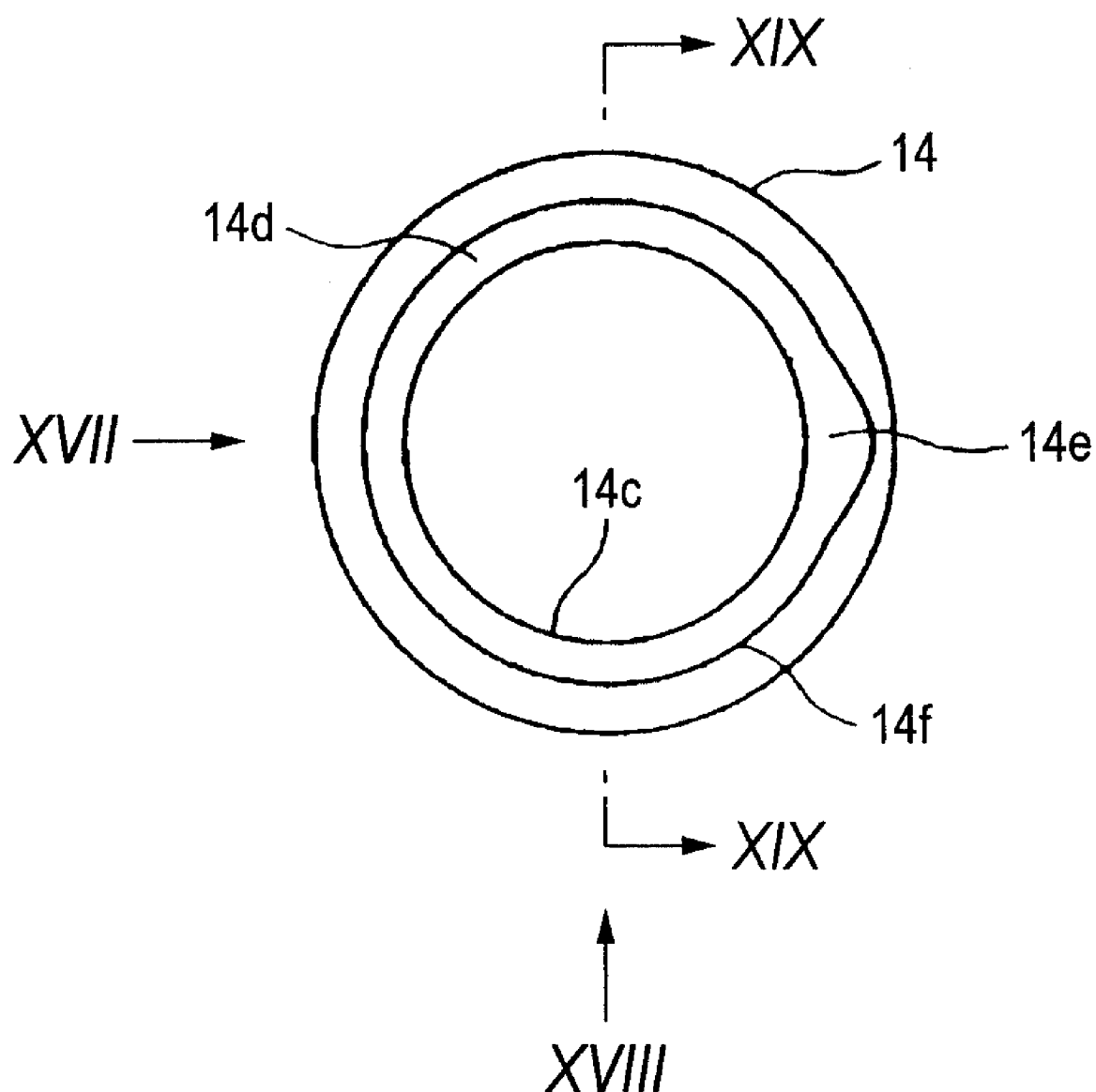
FIG. 16 is a drawing of a holding member 14 as seen in an axial direction.
Figure 17:
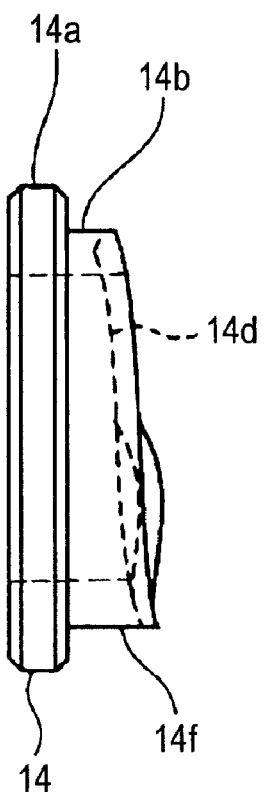
FIG. 17 is a drawing of the holding member 14 in FIG. 16 as seen from a direction indicated by an arrow XVII.
Figure 18:
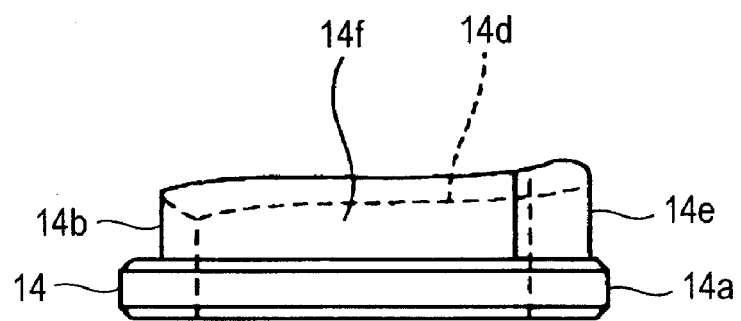
FIG. 18 is a drawing of the holding member 14 in FIG. 16 as seen from a direction indicated by an arrow XVIII.
Figure 19:
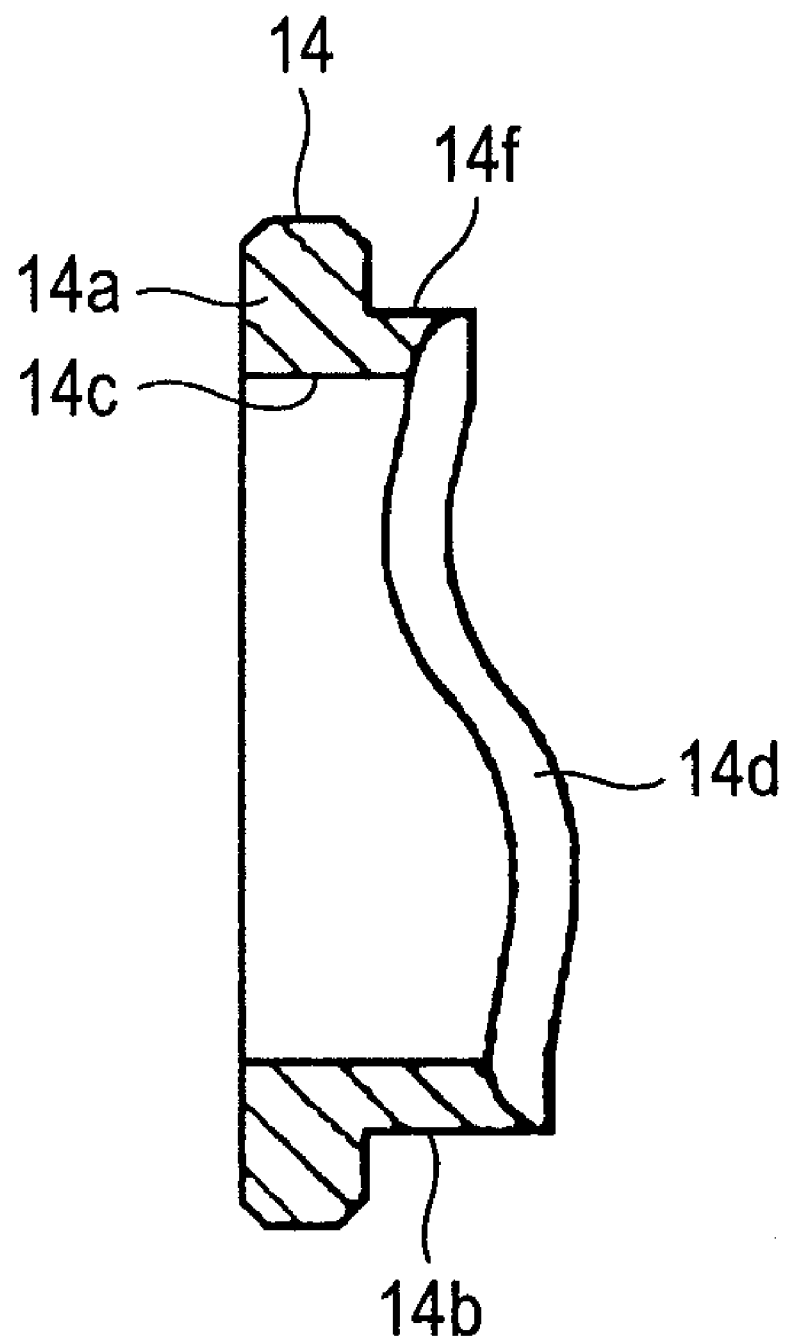
FIG. 19 is a drawing of the holding member 14 in FIG. 16 as taken along the line XIX-XIX and viewed in a direction indicated by arrows.

FIG. 13 is an exploded perspective view of a ball screw mechanism according to a further embodiment, with a screw shaft and balls omitted. FIG. 14 is a drawing of a nut 12 as seen in an axial direction, and FIG. 15 is a drawing of the nut 12 in FIG. 14 as taken along the line XV-XV and viewed in a direction indicated by arrows. FIG. 16 is a drawing of a holding member 14 as seen in an axial direction, FIG. 17 is a drawing of the holding member 14 in FIG. 16 as seen from a direction indicated by an arrow XVII, FIG. 18 is a drawing of the holding member 14 in FIG. 16 as seen from a direction indicated by an arrow XVIII, and FIG. 19 is a drawing of the holding member 14 in FIG. 16 as taken along the line XIX-XIX and viewed in a direction indicated by arrows.

A hollow nut 12 has a flange portion 12e which are formed on an outer circumference thereof and diametrically expanded stepped portions 12f, 12f which are formed on inner circumferences of both axial ends thereof. In addition, as with the embodiments that have been described above, the nut 12 is disposed in such a manner as to surround a screw shaft, not shown, and has female screw grooves 12a (here two female screw grooves which each extend slightly less than a turn round the nut 12) which are formed on an inner circumferential surface thereof. In each female screw groove 12a, a circulating portion 12b is formed on an inner circumferential surface of the nut 12 in such a manner as to connect both ends of the female screw groove 12a together. As is shown in FIG. 13, the circulating portion 12b is formed in such a manner as to gouge away part of the inner circumferential surface 12g (which is shown as a rectilinear portion 12d in FIG. 15) and takes the form of a groove (a depression) of a circular arc-like section which extends in the axial direction. The pair of circulating portions 12b are formed in such a manner as to be spaced apart from each other round the axis of the nut 12 at a phase angle of 180 degrees (refer to FIG. 14). In addition, the female screw groove 12a is the thread groove in which the circulating portions are formed, and a section thereof taken at right angles to the groove is similar to that shown in FIGS. 2, 3.

Two holding members 14 having the same shape each have a large disc portion 14a, a small disc portion 14b and a central opening 14c which passes through these discs. A female screw groove 14d having a shape which is paired with the female screw groove 12a is formed at an end portion of the small disc portion 14b. An outer circumferential side of a rolling path through which balls 3 roll is formed by combing the female screw groove 12a with the female screw groove 14d. In addition, a projecting portion 14e which rises to face the circulating portion 12b is formed on part of an outer circumference of the small disc portion 14b. Here, since the shape of an outer circumferential surface 14f of the small disc portion 14b coincides with a shape resulting when the female screw groove 12a and the circulating portion 12b of the nut 12 are projected in the axial direction, it is easy to put them in phase with each other. An outer circumference of a small cylindrical portion 14b makes up an engagement portion.

An assembling method of the holding member 14 on to the nut 12 will be described.

In FIG. 13, the projection 14e of the small disc portion 14 is aligned with the circulating portion 12b of the nut 12 and is then pushed thereinto while the aligned state is being held as it is. By this, the outer circumferential surface 14f of the small disc portion 14b is fittingly mounted through spigot fitting on an inner circumferential surface which is formed by the rectilinear portion 12d (refer to FIG. 15) which connects to the female screw groove 12a. Namely, the pair of holding members 14 are inserted into the nut 12 from both end sides thereof while shifted from each other at the phase angle of 180 degrees and are mounted on the nut 12, respectively, based on the circulating portions 12b and the projections 14e which function as positioning references. Thereafter, as is shown in FIG. 13, by crimping C by a tool, not shown, to plastically deform an axially outward position of the projection 14e which is brought into engagement with the circulating portion 12b at an outer end face of the large disc portion 14a of the holding member 14, the fixing of the holding member 14 to the nut 12 is implemented. In the event that the crimping is implemented in the vicinity of the circulating portion 12 in this way, a risk is preferably reduced in which the effect of the plastic deformation affects the female screw groove 14d.

When balls and a screw shaft, which are both not shown, are incorporated in the nut 12 for operation, while balls which roll through a rolling path defined within the nut 12 circulate from one end to the other end of the rolling path, since the circulating portion 12b is closed by the projection 14e of the holding member 14b, there is no risk that the balls are dislocated to outside the rolling path.

In the event that the two female screw grooves 12a of the nut 12 are formed in such a manner as to be spaced apart in the axial direction as in the case of this embodiment, in case the circulating portions 12b are provided in the same phase, depending upon forces applied to the ball screw, there is caused a risk that an offset load is generated in the screw shaft and the nut 12 by virtue of force applied to the ball screw.

According to the embodiment, since the two circulating portions 12b are provided in such a manner as to face each other at the phase angle of 180 degrees on the circumference, the force applied to the ball screw can be distributed equally, the generation of offset load in the screw shaft and the nut 12 being thereby suppressed.

Figure 24A:
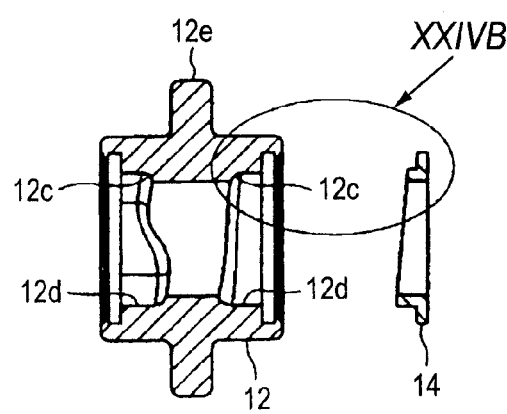
FIG. 24A is an exploded sectional view of a nut and a holding member of a modified example of the embodiment.
Figure 24B:
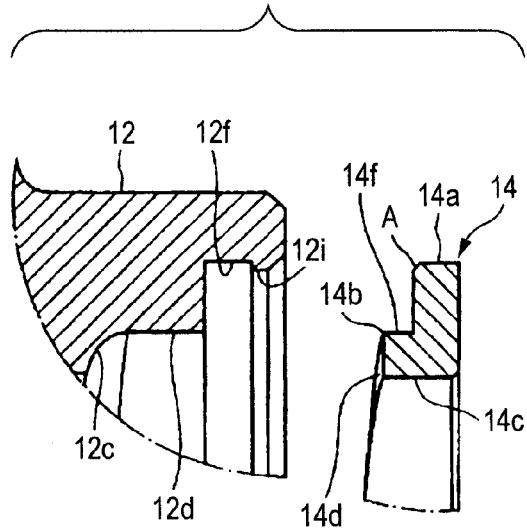
FIG. 24B is a drawing showing a portion indicated by an arrow XXVB of the configuration shown in FIG. 24A in an enlarged fashion.

FIG. 24A is an exploded sectional view of a nut and a holding member of a modified example of the embodiment, and FIG. 24B is a drawing showing a portion indicated by an arrow XXVB of the configuration shown in FIG. 24A in an enlarged fashion.

Although the shape of a holding member 14 is substantially the same as that of the above embodiment, as is shown in FIG. 24, an outer circumference of an axially outward end of a large disc portion 14a is not chamfered, and a chamfered portion A is provided only on an outer circumference of an axially inward end thereof. In addition, a diametrically contracted portion (a projection) 12i, whose inside diameter is smaller than a stepped portion 12f (an outside diameter of the large disc portion 14a), is formed on an outer side of the diametrically expanded stepped portion (a groove) on an inner circumference of an axially end portion of the nut 12. Note that the stepped portion 12f can be formed on the inner circumferential surface of the nut 12 through forging or cutting.

At the time of assemblage, when the holding member 14 is inserted into the nut 12 in the way described above, the introduction is assisted due to the chamfered portion A riding on the projection 12i. Furthermore, the passage of the large disc portion 14a is permitted by the elastic deformation of either of the holding member 14 and the nut 12. Since the elastic deformation is cancelled after the passage of the large disc portion 14a, the dislocation of the holding member 14 can be prevented by the projection 12i in such a state that an outer circumferential surface of the large disc portion 14a is fitted in an inner circumferential surface of the stepped portion 12f. By this, the necessity of the aforesaid crimping is obviated. This modified example is effective when the holding member 14 is molded of a resin.

Figure 25A:
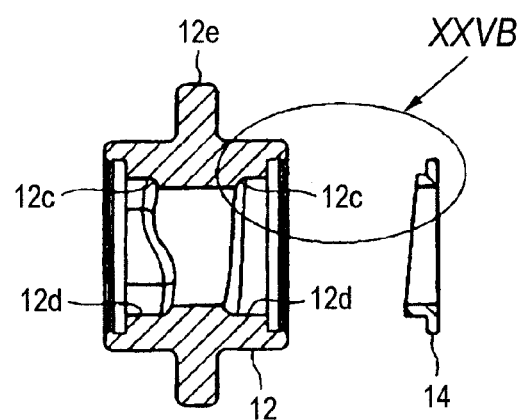
FIG. 25A is an exploded sectional view of a nut and a holding member of another modified example of the embodiment.
Figure 25B:
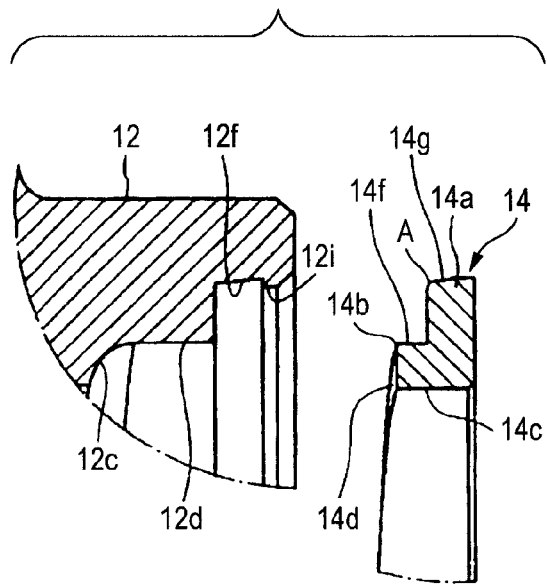
FIG. 25B is a drawing showing a portion indicated by an arrow XXVB of the configuration shown in FIG. 25A in an enlarged fashion.

FIG. 25A is an exploded sectional view of a nut and a holding member of another modified example of the embodiment, and FIG. 25B is a drawing showing a portion indicated by an arrow XXVB of the configuration shown in FIG. 25A in an enlarged fashion.

Although the shape of a holding member 14 is substantially the same as that of the above embodiment, as is shown in FIG. 25, an outer circumference of an axially outward end of a large disc portion 14a is not chamfered. Instead, a chamfered portion A is provided only on an outer circumference of an axially inward end thereof, and furthermore, an outer circumferential surface 14g of the large disc portion 14 is formed into a tapered surface which is diametrically expanded at it extends axially outwards. On the other hand, a stepped portion (a groove) 12f of a nut 12 is formed into a tapered surface which matches the outer circumferential surface 14g, and a diametrically contracted portion (a projection) 12i, whose inside diameter is smaller than a maximum outside diameter of the large disc portion 14a, is formed on an outer side of the stepped portion 12f. Note that the stepped portion 12f can be formed on an inner circumferential surface of the nut 12 through forging or cutting.

At the time of assemblage, when the holding member 14 is inserted into the nut 12 in the way described above, the introduction is assisted due to the chamfered portion A riding on the projection 12i. Furthermore, the passage of the large disc portion 14a is permitted by the elastic deformation of either of the holding member 14 and the nut 12. Since the elastic deformation is cancelled after the passage of the large disc portion 14a, the dislocation of the holding member 14 can be prevented by the projection 12i in such a state that an outer circumferential surface of the large disc portion 14a is fitted in an inner circumferential surface of the stepped portion 12f. By this, the necessity of the aforesaid crimping is obviated. This modified example is effective when the holding member 14 is molded of a resin. In addition, looseness is suppressed through fitment of the tapered surfaces.

Figure 26A:
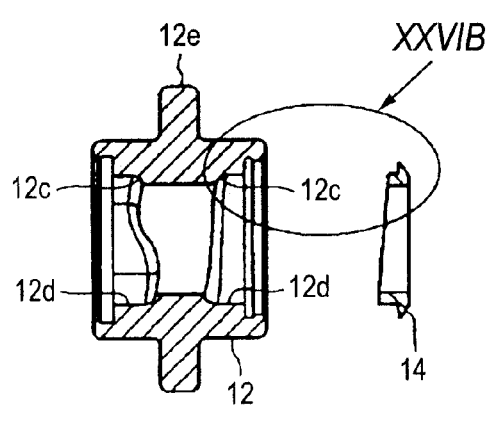
FIG. 26A is an exploded sectional view of a nut and a holding member of another modified example of the embodiment.
Figure 26B:
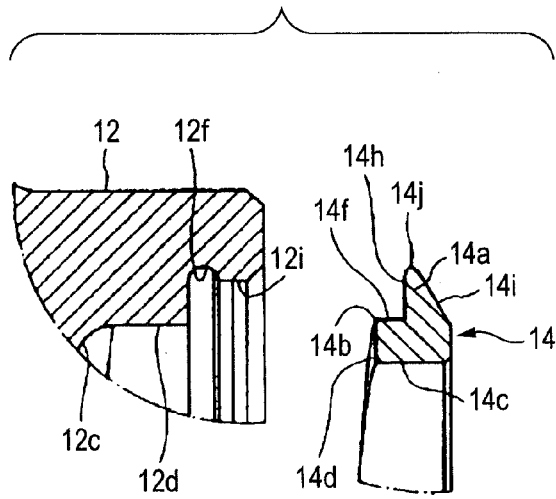
FIG. 26B is a drawing showing a portion indicated by an arrow XXVIB of the configuration shown in FIG. 26A in an enlarged fashion.

FIG. 26A is an exploded sectional view of a nut and a holding member of another modified example of the embodiment, and FIG. 26B is a drawing showing a portion indicated by an arrow XXVIB of the configuration shown in FIG. 26A in an enlarged fashion.

Although the shape of a holding member 14 is substantially the same as that of the above embodiment, in axially sectional views shown in FIG. 26, a large disc portion 14a is made up of a radial inner surface 14h which extends in a radial direction, a tapered outer surface 14i which is diametrically contracted as it extends axially outwards and an annular portion 14j of a circular arc-like cross section which connects the radial inner surface 14h with the tapered outer surface 14j. On the other hand, a stepped portion 12f of a nut 12 is formed into a circular arc groove which corresponds to the annular portion 14j of the circular arc-like cross section. A diametrically contracted portion (a projection) 12i, whose inside diameter is smaller than a maximum outside diameter of the large disc portion 14a, is formed on an outer side of the stepped portion 12f. Note that the stepped portion 12f can be formed on an inner circumferential surface of the nut 12 through forging or cutting.

At the time of assemblage, when the holding member 14 is inserted into the nut 12 in the way described above, the passage of the large disc portion 14a is permitted by the elastic deformation of either of the holding member 14 and the nut 12. Since the elastic deformation is cancelled after the passage of the large disc portion 14a, the dislocation of the holding member 14 can be prevented by the projection 12i in such a state that the annular portion 14j of the circular arc-like cross section of the large disc portion 14a is fitted in an inner circumferential surface of the stepped portion 12f. By this, the necessity of the aforesaid crimping is obviated. This modified example is effective when the holding member 14 is molded of a resin. In addition, a seal function is obtained due to the large disc portion 14a being brought into engagement with the stepped portion 12f.

Figure 27A:
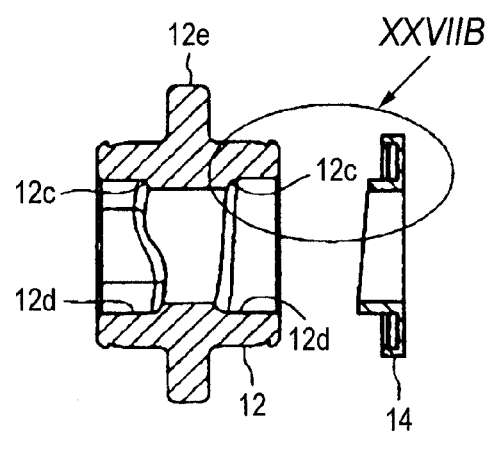
FIG. 27A is an exploded sectional view of a nut and a holding member of another modified example of the embodiment.
Figure 27B:
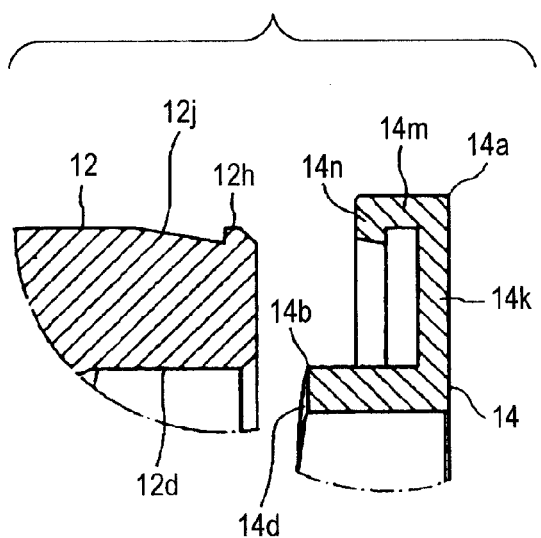
FIG. 27B is a drawing showing a portion indicated by an arrow XXVIIB of the configuration shown in FIG. 27A in an enlarged fashion.

FIG. 27A is an exploded sectional view of a nut and a holding member of another modified example of the embodiment, and FIG. 27B is a drawing showing a portion indicated by an arrow XXVIIB of the configuration shown in FIG. 27A in an enlarged fashion.

Although the shape of a holding member 14 is substantially the same as that of the above embodiment, in axially sectional views shown in FIG. 27, a large disc portion 14a is made up of a radial inner surface 14k which extends in a radial direction, a cylindrical portion 14m which extends axially inwards from an outer edge of the radial portion 14k, and an engagement portion 14n which extends a short distance radially inwards from a distal end of the cylindrical portion 14m.

On the other hand, a stepped portion is not formed on an inner circumferential surface of a nut 12, and instead, a projection 12h is formed on an outer circumference of an axial end portion thereof in such a manner as to extend (or discontinuously) in a circumferential direction. In addition, an outer circumferential surface of the nut 12 which is adjacent to the projection 12h is formed into a tapered surface (a shallow groove) 12j which is diametrically expanded as it extends axially inwards. Note that in the event that an inner circumferential surface of the engagement portion 14h and an outer circumferential surface of the projection 12h are formed into tapered shapes of the same orientation which are diametrically expanded as they extend axially inwards, the insertion is preferably facilitated. The projection 12h and the tapered surface 12j can be formed on an outer surface of the nut 12 through forging or cutting.

At the time of assemblage, when a small disc portion 14b of the holding member 14 is inserted into a rectilinear portion 12d of the nut 12 in such a manner that both are brought into engagement with each other in the way described above, the engagement portion 14n and the cylindrical portion 14m come to be positioned radially outwards of the nut 12. As this occurs, the engagement portion 14n can pass over the projection 12h due to the cylindrical portion 14m being elastically deformed. Since the elastic deformation of the cylindrical portion 14m is cancelled after the passage of the engagement portion 14n, while the engagement portion 14n is brought into engagement with the tapered surface 12j, the projection 12h is made to prevent the dislocation of the holding member 14. By this, the necessity of the aforesaid crimping is obviated. This modified example is effective when the holding member 14 is molded of a resin.

Figure 28A:
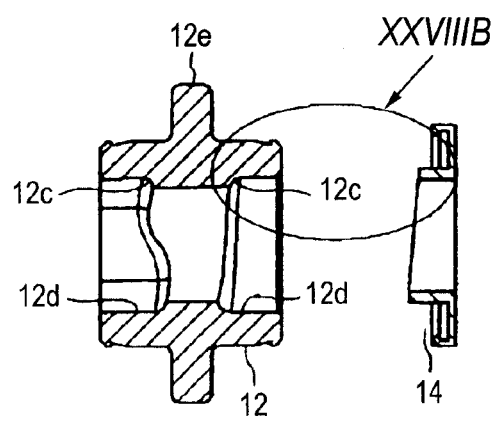
FIG. 28A is an exploded sectional view of a nut and a holding member of another modified example of the embodiment.
Figure 28B:
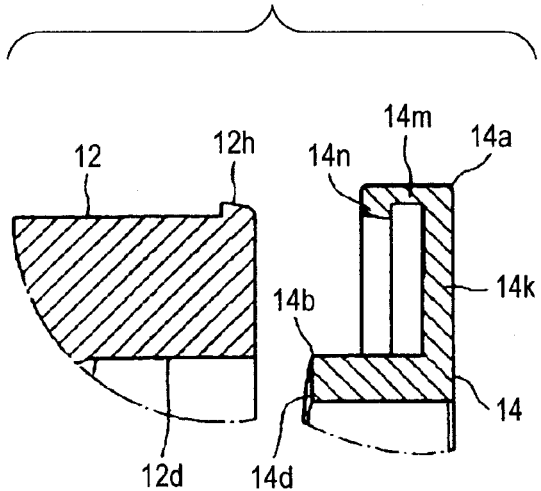
FIG. 28B is a drawing showing a portion indicated by an arrow XXVIIIB of the configuration shown in FIG. 28A in an enlarged fashion.

FIG. 28A is an exploded sectional view of a nut and a holding member of another modified example of the embodiment, and FIG. 28B is a drawing showing a portion indicated by an arrow XXVIIIB of the configuration shown in FIG. 28A in an enlarged fashion.

Although the shape of a holding member 14 is the same as that of the modified example shown in FIG. 27, it differs in that on a nut 12, a sectional shape of a projection 12h is a smooth circular arc shape which diametrically expands as it extends axially inwards and that no tapered surface is formed on an outer circumference thereof. The other configurations are the same as those of the modified example shown in FIG. 27. The projection 12h can be formed on an outer circumferential surface of the nut 12 through forging or cutting.

FIG. 29A is a drawing of a holding member 14 according to another modified example as seen in an axial direction from an inside of a nut, FIG. 29B is an axially sectional view of the holding member 14, and FIG. 29C is a drawing of the holder 14 as seen in the axial direction from an outside of the nut.

In FIG. 29, the holding member 14 is made up of a C-shaped steel plate 14A and a resin member 14B which is injection molded on the steel plate 14A. Holes 14p, 14p are formed in the vicinity of both circumferential end portions of the steel plate 14A. On the holding member 14, a large disc portion 14a, which is integrated with the steel plate 14A, and a small disc portion 14b, which has the same shape as that of the above embodiment and which is made of only a resin, are formed, and these disc portions are discontinued in a circumferential direction so as to match the C-shape of the steel plate 14A. A gap formed in the discontinued portion is made to be smaller than an outside diameter of a ball in such a state that the holding member 14 is installed.

When the holding member 14 according to this modified example is installed on the a nut 12 (refer to FIG. 24), for example, distal ends of bifurcated portions of a scissors-like clamping tool (not shown) are inserted into the holes 14p, 14p, respectively, so as to narrow the gap. By this step, since the steel plate 14A is elastically deformed and an outside diameter of the large discportion 14a is decreased, the holding member 14 can be inserted into the nut 12 by riding over, for example, an inner circumferential projection 12i thereof. When the clamping tool is disengaged from the holes 14p, 14p, since the steel plate 14A is restored from the elastically deformed state, the large disc portion 14a (an outer circumferential surface of the steel plate 14A) comes into abutment with a stepped portion 12f of the nut 12, thereby making it possible to prevent the dislocation of the holding member 14.

Figure 30A:
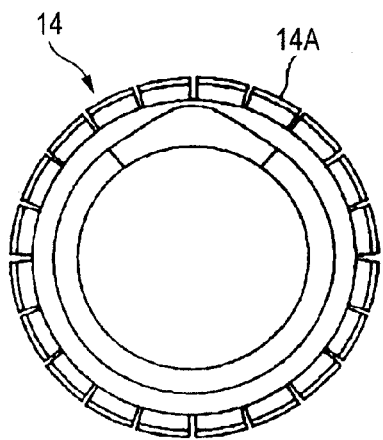
FIG. 30A is a drawing of a holding member 14 according to another modified example as seen in an axial direction from an inside of a nut.
Figure 30B:
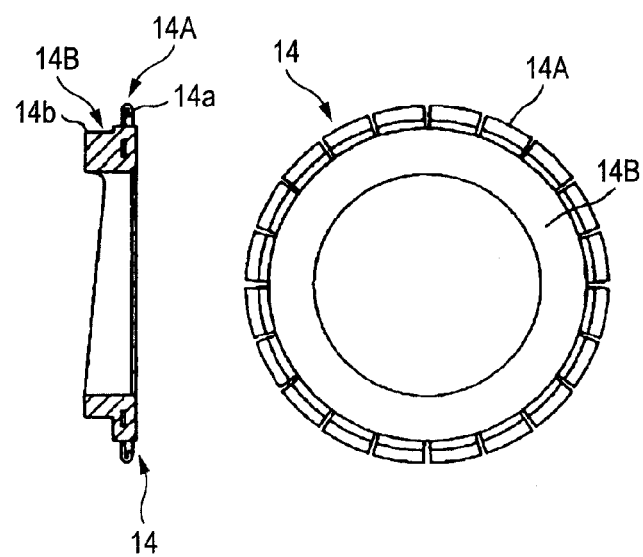
FIG. 30B is an axially sectional view of the holding member 14.
Figure 30C:
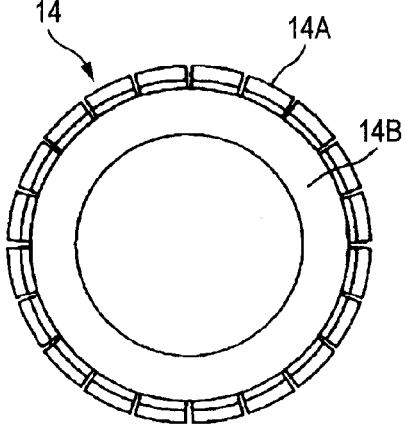
FIG. 30C is a drawing of the holder 14 as seen in the axial direction from an outside of the nut.

FIG. 30A is a drawing of a holding member 14 according to another modified example as seen in an axial direction from an inside of a nut, FIG. 30B is an axially sectional view of the holding member 14, and FIG. 30C is a drawing of the holder 14 as seen in the axial direction from an outside of the nut.

In FIG. 30, a holding member 14 is made up of a steel plate 14A is formed into a doughnut-like disc shape on a circumference edge of which a plurality of slits are formed and a resin material 14B which is injection molded on the steel plate 14A. On the holding member 14, a large disc portion 14a, which is integrated with the steel plate 14A, and a small disc portion 14b, which has the same shape as that of the above embodiment and which is made of only a resin, are formed.

When the holding member 14 according to this modified example is pushed into a nut 12 (refer to FIG. 24), the steel plate 14A is deformed into a tapered shape due to the plurality of slits, and the holding member 14 can be inserted into the nut 12 by riding over, for example, an inner circumferential projection 12i thereof. Since the steel plate 14A is restored from the elastically deformed state at a point in time when the steel plate 14A has ridden over the projection 12i, the large disc portion 14a comes into abutment with a stepped portion 12f of the nut 12, thereby making it possible to prevent the dislocation of the holding member 14.

Figure 31A:
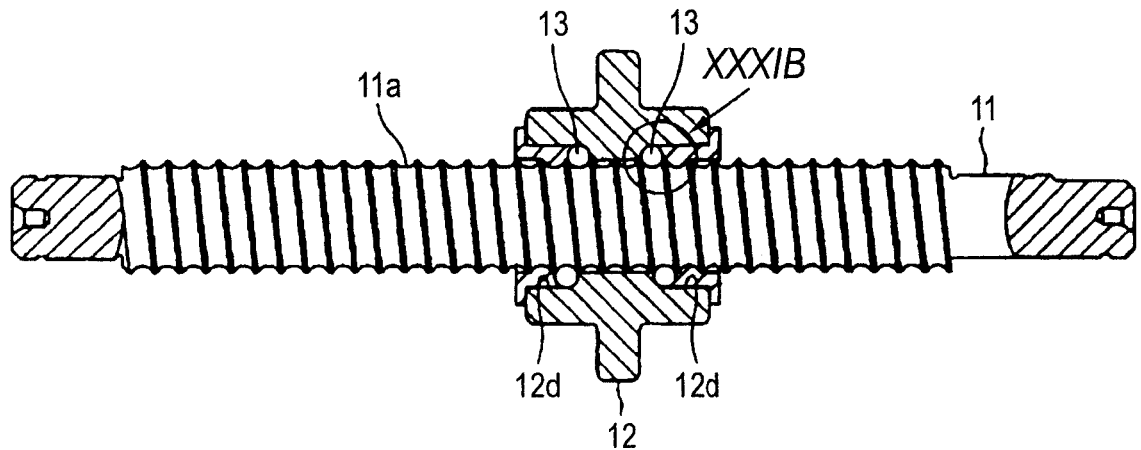
FIG. 31A is a sectional view of a ball screw mechanism according to another embodiment.
Figure 31B:
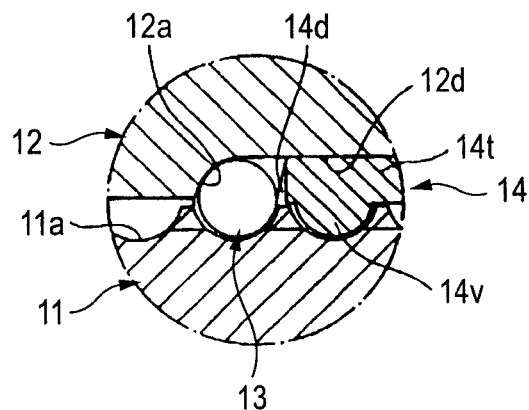
FIG. 31B is a drawing showing a portion indicated by an arrow XXXIB of the configuration showing in FIG. 31A in an enlarged fashion.
Figure 31C:
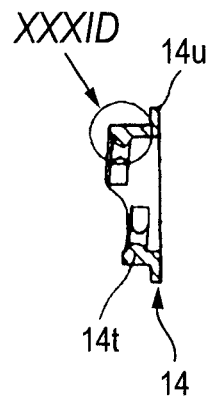
FIG. 31C is a sectional view of a holding member according to the embodiment.
Figure 31D:
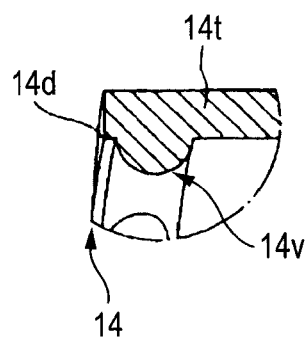
FIG. 31D is a drawing showing a portion indicated by an arrow XXXID of the configuration shown in FIG. 31C in an enlarged fashion.

FIG. 31A is a sectional view of a ball screw mechanism according to another embodiment. FIG. 31B is a drawing showing a portion indicated by an arrow XXXIB of the configuration showing in FIG. 31A in an enlarged fashion. FIG. 31C is a sectional view of a holding member according to the embodiment. FIG. 31D is a drawing showing a portion indicated by an arrow XXXID of the configuration shown in FIG. 31C in an enlarged fashion. Although the ball screw mechanism is made up of a screw shaft 1, a nut 12, balls 13 and a holding member 14, only what differs from the above embodiments will be described.

In FIG. 31, the holding member 14 has a cylindrical portion 14t which fits in a rectilinear portion 12d of the nut 12 and a flange portion 14u which extends from an end portion of the cylindrical portion 14t in a radial direction. A female screw groove 14d, which is similar to those of the embodiments that have been described above, is provided at a distal end of the cylindrical portion 14t, and a projection 14v, which corresponds to an male screw groove 11a f the screw shaft 11, is provided on an inner circumference of the cylindrical portion 14t. When the holding member 14 is mounted on the nut 12, the projection 14v is not in contact with the male screw groove 11a of the screw shaft 11 and is kept facing the male screw groove 11a with a slight gap provided therebetween. By this, a foreign matter sticking to the male screw groove 11a is suppressed from intruding into an interior of the nut 12.

Figure 32A:
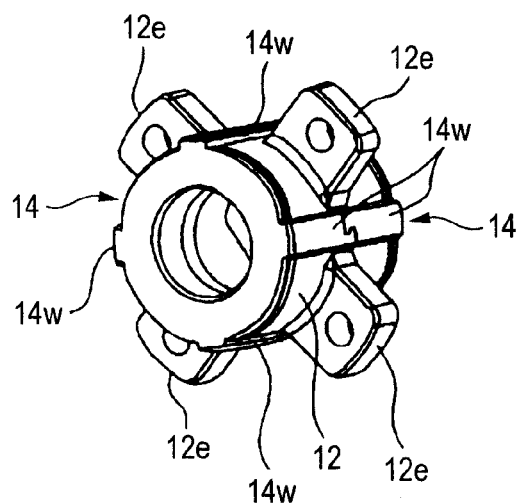
FIG. 32A is a perspective view of a nut and a holding member according to another embodiment.
Figure 32B:
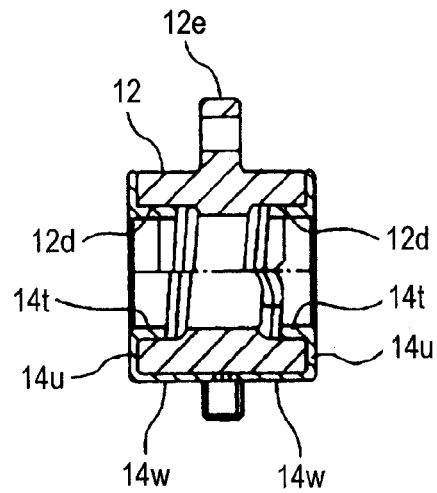
FIG. 32S is an axially sectional view of the configuration shown in FIG. 32A.
FIG. 32C is a perspective view of a holding member.
FIG. 32D is an axially sectional view of the configuration shown in FIG. 32C.
Figure 32C:
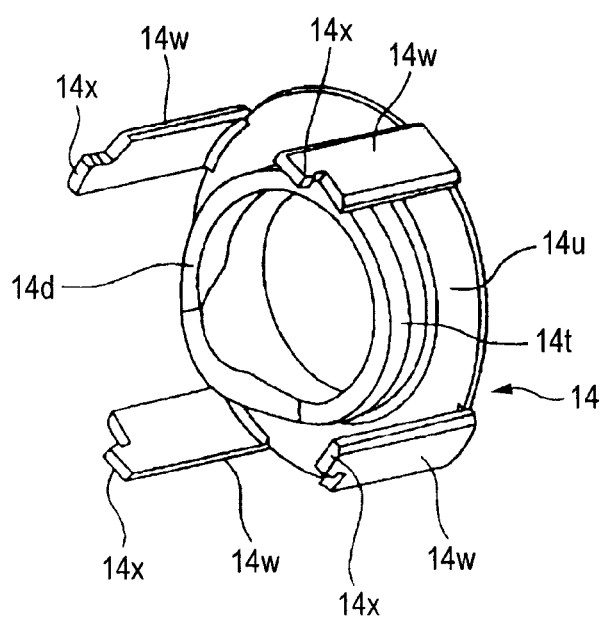
Figure 32D:
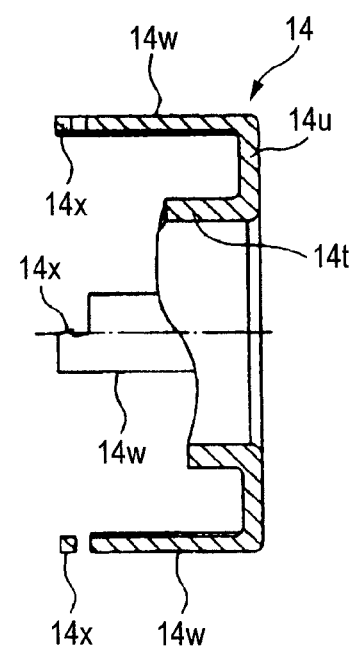

FIG. 32A is a perspective view of a nut and a holding member according to another embodiment. FIG. 32B is an axially sectional view of the configuration shown in FIG. 32A. FIG. 32C is a perspective view of a holding member. FIG. 32D is an axially sectional view of the configuration shown in FIG. 32C.

In FIG. 32, a holding member 14 has a cylindrical portion 14t which fits in a rectilinear portion 12d of a nut 12, a flange portion 14u which extends in a radial direction from an end portion of the cylindrical portion 14t, and four arms 14w which extends in an axial direction from an outer edge of the flange portion 14u. An female screw groove, which is similar to those of the embodiments that have been described above, is provided at a distal end of the cylindrical portion 14*t*. A hook portion 14*x* is formed at a distal end of the arm 14*w*. Note that in this embodiment, flange portions 12*e* of the nut 12 are formed into four plates which extend radially.

When the holding members 14, 14 are mounted at both ends of the nut 12, respectively, as is shown in FIG. 32A, the arms 14*w* are made to face the mating arms 14*x* between the adjacent flange portions 12*e* and are then brought into hook engagement with each other with the hook portions 14*x* hooked to each other. Since the facing arms 14*w*, 14*w* are connected to each other in such a state that the hook portions 14*x* are hooked to each other, the holding members 14, 14 are made not to be dislocated from the nut 12.

FIG. 20 show drawings which explain another assembling method of the ball screw mechanism according to the embodiment The screw shaft 1 has no rise on the male screw groove 1*a* but has a starting point of the male screw groove 1*a* at eight end thereof.

Firstly, as is shown in FIG. 20A, an end portion of the screw shaft 1 is inserted into an interior of the nut 12 whose axis is oriented in a perpendicular direction. As this occurs, a positional relationship is made to result in which the starting point of the male screw groove 1*a* on an outer circumference of an upper end portion of the screw shaft 1 in the direction of gravity oppositely faces a shallowest position of the female screw groove 12*a* on an upper end (one end portion) side of the nut 12.

In this state, a rolling path is defined by the female screw groove 12*a* and the male screw groove 1*a* of the screw shaft 1 which oppositely faces the female screw groove 12*a*, and a circulating path is defined by the circulating portion 12*h* which connects to the rolling path and the male screw groove 1*a* of the screw shaft 1 which oppositely faces the circulating portion 12*b*, whereby the balls 3 are loaded into the rolling path and the circulating path from above in the direction of gravity (refer to FIG. 20B).

Following this, as is shown in FIG. 20C, the holding member 14 is made to approach from above in the direction of gravity of the nut 12, and as has been described by reference to FIGS. 13 to 19, the projection 14*e* of the small disc portion 14*b* is aligned with the circulating portion 12*b* of the nut 12. By forcing the holding member 14 axially into the nut 12 as it is in that state, the outer circumferential surface 14*f* of the small disc portion 14*b* is fittingly mounted through spigot fitting in the inner circumferential surface which is formed by the rectilinear portion 12*d* which connects to the female screw groove 12*a* (refer to FIG. 20D).

Thereafter, the nut 12 and the screw shaft 1 are turned upside down. As this occurs, as is shown in FIG. 20E, a positional relationship is made to result in which the starting point of the male screw groove 1*a* on an cuter circumference of an upper end portion of the screw shaft 1 in the direction of gravity oppositely faces a shallowest position of the female screw groove 12*a* on an upper end (the other end portion) side of the nut 12. In this state, a rolling path is defined by the female screw groove 12*a* and the male screw groove 1*a* of the screw shaft 1 which oppositely faces the female screw groove 12*a*, and a circulating path is defined by the circulating portion 12*b* which connects to the rolling path and the male screw groove 1*a* of the screw shaft 1 which oppositely faces the circulating portion 12*b*, whereby the balls 3 are loaded into the rolling path and the circulating path from above in the direction of gravity.

Following this, as is shown in FIG. 20F, the other holding member 14 is made to approach from above in the direction of gravity of the nut 12. Following this, as has been described by reference to FIGS. 13 to 19, the projection 14*e* of the small disc portion 14*b* is aligned with the circulating portion 12*b* of the nut 12, and the holding member 14 is forced axially into the nut 12 as it is in that state. By this step, the outer circumferential surface 14*f* of the small disc portion 14*b* is fittingly mounted through spigot fitting in the inner circumferential surface which is formed by the rectilinear portion 12*d* which connects to the female screw groove 12*a* (refer to FIG. 20G). Thus, the assemblage of the ball screw mechanism ends.

According to the embodiment, by inserting the screw shaft 1 into the nut 12, loading the balls 3 into the circulating portion 12*b* and the rolling path (12*a*, 1*a*) which connects to the circulating portion 12*b*, and thereafter mounting the holding member 14, the balls can be loaded without using a temporary shaft. Consequently, the assembling work is simplified. The assembling method can, needless to say, be applied to the ball screw mechanism shown in FIGS. 1 to 12.

In the embodiments that have been described heretofore, the ball screw mechanism can be assembled using a temporary shaft (not shown) having the same male screw groove in place of the screw shaft 1. As this occurs, as with the method that has been described above, the temporary shaft is inserted into the interior of the nut 12, the balls 3 are loaded into one of the circulating portion of the nut 12 and the rolling path which connects to the circulating portion from above in the direction of gravity, and the holding member 14 is thereafter assembled to the nut 12. Hereafter, the nut 12 and the temporary shaft are turned upside down, the balls 3 are loaded in the other circulating portion and the rolling path which connects to the circulating portion from above in the direction of gravity, and the holding member 14 is assembled to the nut 12. Furthermore, the screw shaft 1 is connected to the temporary shaft in such a manner that the male screw grooves 1*a* are connected to each other, and after the screw shaft 1 is drawn into the interior of the nut 12 while the screw shaft 1 is being rotated, the temporary shaft and the screw shaft 1 are disconnected from each other, whereby the assemblage of the ball screw mechanism is implemented. With this method adopted, a damage to the male screw groove 1*a* of the screw shaft 1 can be prevented at the time of assemblage.

Thus, while the invention has been described by reference to the embodiments thereof, the invention is not construed as being limited to the embodiments, and hence, the invention can, of course, be modified and improved appropriately.

While in the embodiments, the ball screw mechanism of the type is described in which the balls are circulated on the nut side, in a case where the balls are circulated on the screw shaft side, an female screw groove can be provided along the full circumference of the nut, while one or two male screw grooves can be provided on the outer circumference of the screw shaft. The male screw groove extends round the axis of the screw shaft through 360 degrees or less, and the shape of a sectional thereof taken at right angles to the groove includes a circular arc portion of 90 degrees or less and a rectilinear portion which connects to the circular arc portion at a bottom of the groove and extends in parallel with the axis, whereby after molding, a mold which molds the male screw groove of the screw shaft can be removed simply in the axial direction, and consequently, the necessity of provision of a parting plane which passes through the male screw groove can be obviated, thereby making it possible to easily form the male screw groove which is free from a difference in level or a stepped portion.

In addition, the invention can be applied not only to the nut rotation and screw shaft linear motion type ball screw mechanism but also to a screw shaft rotation and nut linear motion type ball screw mechanism.

Furthermore, when made of a resin, the holding member can be formed through injection molding, while when made of a metallic material, the holding member is preferably formed through sintering or forging. In addition, the inner circumferential surface and axial side surface of the circulating portion of the nut can be formed through injection molding, sintering or forging, the screw shaft can be formed through rolling, and the portion (for example, the flange portion 12e) of the nut which is adapted to be mounted on the mating part can be formed injection molding, sintering or forging.

The invention claimed is:

1. A ball screw mechanism comprising:
   a screw shaft provided with a male screw groove on an outer circumferential surface thereof;
   a nut disposed so as to surround the screw shaft and provided with a female screw groove on an inner circumferential surface thereof; and
   a plurality of balls disposed so as .to freely roll along a rolling path formed between both the opposing screw grooves;
   wherein one of the screw shaft and the nut comprises a circulating portion connected to the screw groove of said one of the screw shaft and the nut to circulate the balls from one end to the other end of the rolling path,
   wherein the screw groove of said one of the screw shaft and the nut extends, from the one end to the other end of the rolling path, within a range of not more than 360 degrees round an axis of the screw shaft or the nut, and a sectional shape thereof taken at right angles to the screw groove includes a circular arc portion of 90 degrees or less and a connecting portion which connects to the circular arc portion at a bottom of the screw groove, and
   wherein the connecting portion extends from the bottom of the screw groove toward an axial end of the ball screw mechanism such that, when observed in an axial view, the connecting portion does not overlap the circular arc portion.

2. The ball screw mechanism as set forth in claim 1, wherein the connecting portion is rectilinear in the sectional shape taken at right angles to the groove.

3. The ball screw mechanism as set forth in claim 1, wherein the connecting portion is curvilinear in the sectional shape taken at right angles to the groove.

4. The ball screw mechanism as set forth in claim 1, wherein said one of the screw shaft and the nut is provided with another screw groove, and an axial distance between the bottom of the screw groove and a bottom of the other screw groove of said one of the screw shaft and the nut is equal to less than an axial distance between bottoms of portions of the screw groove of the other of the screw shaft and the nut to which the screw grooves of said one of the screw shaft and the nut are opposed.

5. The ball screw mechanism as set forth in claim 4, wherein the nut comprises the circulating portion and another circulating portion, and one of the circulating portions is disposed at a phase angle of 180 degrees round the axis relative to the other of the circulating portions.

6. The ball screw mechanism as set forth in claim 1, wherein the circulating portion is a depression provided on the outer circumferential surface of the screw shaft or the inner circumferential surface of the nut, and the ball screw mechanism further comprises:
   a holding member provided adjacent to at least the circulating portion to hold the balls.

7. The ball screw mechanism as set forth in claim 6, wherein the holding member is fittingly mounted on the nut and the circulating portion is used as a positioning reference to fittingly mount the holding member on the nut.

8. The ball screw mechanism as set forth in claim 6, wherein a fitting portion of the holding member which fits in the nut includes a shape that matches the circulating portion of the nut in the axial direction.

9. The ball screw mechanism as set forth in claim 6, wherein after having been fittingly mounted on the nut, the holding member is plastically deformed in the vicinity of the circulating portion.

10. The ball screw mechanism as set forth in claim 6, wherein the holding member is formed by cutting a resin material or a metallic material.

11. The ball screw mechanism as set forth in claim 6, wherein the holding member is formed by injection molding, sintering or forging.

12. The ball screw mechanism as set forth in claim 6, wherein the holding member is formed by injection molding a resin material over a C-shaped metallic plate material.

13. The ball screw mechanism as set forth in claim 6, wherein the holding member is formed by injection molding a resin material over a metallic disc on a circumferential edge of which a plurality of slits are formed.

14. The ball screw mechanism as set forth in claim 6, wherein the holding member is mounted on the nut by engaging with a groove or projection which is formed on the inner circumferential surface of the nut by forging or cutting.

15. The ball screw mechanism as set forth in claim 6, wherein the holding member is mounted on the nut by being brought into engagement with a groove or projection which is formed on an outer circumferential surface of the nut by forging or cutting.

16. The ball screw mechanism as set forth in claim 6, further comprising another holding member, wherein the holding members are mounted on the nut by engagement of one of the holding members with the other of the holding members.

17. The ball screw mechanism as set forth in claim 6, wherein the holding member has a projection which corresponds to the male screw groove of the screw shaft, and that when mounted on the nut, the projection oppositely faces the male screw groove without touching it.

18. The ball screw mechanism as set forth in claim 1, wherein the screw groove which connects to the circulating portion is formed through injection molding, sintering or forging.

19. The ball screw mechanism as set forth in claim 1, wherein an inner circumferential surface and an axial side surface of the circulating portion are formed through injection molding, sintering or forging.

20. The ball screw mechanism as set forth in claim 1, wherein the screw shaft is formed through rolling.

21. The ball screw mechanism as set forth in claim 1, wherein a portion of the nut which is mounted on a mating part is formed through injection molding, sintering or forging.

22. An assembling method of a ball screw mechanism which comprises:
   a screw shaft provided with a male screw groove on an outer circumferential surface thereof;
   a nut disposed so as to surround the screw shaft and provided with a female screw groove on an inner circumferential surface thereof;
   a plurality of balls disposed so as to freely roll along a rolling path formed between both the opposing screw grooves; and a holding member:
wherein one of the screw shaft and the nut comprises a circulating portion connected to the screw groove of said one of the screw shaft and the nut to circulate the balls from one end to the other end of the rolling path,
wherein the holding member is provided adjacent to the circulating portion to hold the balls,
wherein the screw groove of said one of the screw shaft and the nut extends, from the one end to the other end of the rolling path, within a range of not more than 360 degrees round an axis of the screw shaft or the nut, and a sectional shape thereof taken at right angles to the screw groove includes a circular arc portion of 90 degrees or less and a connecting portion which connects to the circular arc portion at a bottom of the screw groove, and
wherein the connecting portion extends from the bottom of the screw groove toward an axial end of the ball screw mechanism such that, when observed in an axial view, the connecting portion does not overlap the circular arc portion,
the assembling method comprising:
inserting the screw shaft into an interior of the nut; and
mounting the holding member after the balls are loaded in the circulating portion and the rolling path which connects to the circulating portion.

23. The ball screw mechanism assembling method as set forth in claim 22, wherein
the ball screw mechanism comprises another holding member and said one of the screw shaft and the nut comprises another circulating portion,
after the balls are loaded in one of the circulating portions and the rolling path which connects to the one of the circulating portions from thereabove in a gravity direction and one of the holding members is assembled, the nut and the screw shaft are inverted in the gravity direction, so that balls are loaded in the other circulating portions and another rolling path which connects to the other of the circulating portions from thereabove in the gravity direction and the other of the holding members is assembled.

24. An assembling method of a ball screw mechanism which comprises:
a screw shaft provided with a male screw groove on an outer circumferential surface thereof;
a nut disposed so as to surround the screw shaft and provided with a female screw groove on an inner circumferential surface thereof;
a plurality of balls disposed so as to freely roll along a rolling path formed between both the opposing screw grooves; and
a holding member;
wherein one of the screw shaft and the nut comprises a circulating portion connected to the screw groove of said one of the screw shaft and the nut to circulate the balls from one end to the other end of the rolling path,
wherein the holding member is provided adjacent to the circulating portion to hold the balls
wherein the screw groove of said one of the screw shaft and the nut extends, from the one end to the other end of the rolling path, within a range of not more than 360 degrees round an axis of the screw shaft or the nut, and a sectional shape thereof taken at right angles to the screw groove includes a circular arc portion of 90 degrees or less and a connecting portion which connects to the circular arc portion at a bottom of the screw groove, and
wherein the connecting portion extends from the bottom of the screw groove toward an axial end of the ball screw mechanism such that, when observed in an axial view, the connecting portion does not overlap the circular arc portion,
the assembling method comprising:
inserting a temporary shaft into an interior of the nut,
mounting the holding member after the balls are loaded in the circulating portion and the rolling path which connects to the circulating portion,
the screw shaft is connected to the temporary shaft, and
after the screw shaft is drawn into the interior of the nut while the temporary shaft and the screw shaft are being rotated, the temporary shaft and the screw shaft are disconnected from each other.

25. The ball screw mechanism assembling method as set forth in claim 24, wherein
the ball screw mechanism comprises another holding member and said one of the screw shaft and the nut comprises another circulating portion, after the balls are loaded in one of the circulating portions and the rolling path which connects to the one of the circulating portion from thereabove in a gravity direction and one of the holding members is assembled, the nut and the temporary shaft are inverted in the gravity direction, and
balls are loaded in the other of the circulating portions and another rolling path which connects to the other of the circulating portions from thereabove in the gravity direction and the other of the holding members is mounted.

* * * * *